(12) United States Patent
Qiu et al.

(10) Patent No.: US 9,047,465 B2
(45) Date of Patent: Jun. 2, 2015

(54) METHODS AND APPARATUS FOR AUTOMATIC SECURITY CHECKING IN SYSTEMS THAT MONITOR FOR IMPROPER NETWORK USAGE

(75) Inventors: Chaoxin Charles Qiu, Austin, TX (US); William Chorley, Spicewood, TX (US); Diana Panek, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2380 days.

(21) Appl. No.: 11/562,748

(22) Filed: Nov. 22, 2006

(65) Prior Publication Data
US 2008/0120688 A1     May 22, 2008

(51) Int. Cl.
| | |
|---|---|
| H04L 12/66 | (2006.01) |
| G06F 21/55 | (2013.01) |
| H04L 29/06 | (2006.01) |
| H04W 4/00 | (2009.01) |
| H04L 12/28 | (2006.01) |
| H04L 12/56 | (2006.01) |

(52) U.S. Cl.
CPC ............ G06F 21/554 (2013.01); G06F 21/552 (2013.01); H04L 63/20 (2013.01)

(58) Field of Classification Search
USPC ...................................... 370/352, 329, 395.2
See application file for complete search history.

(56) References Cited

U.S. PATENT DOCUMENTS

| | | | |
|---|---|---|---|
| 6,310,873 B1 | 10/2001 | Rainis et al. | |
| 6,430,275 B1 | 8/2002 | Voit et al. | |
| 6,601,048 B1 | 7/2003 | Gavan et al. | |
| 6,961,334 B1 | 11/2005 | Kaczmarczyk | |
| 7,366,136 B1 * | 4/2008 | Kalbag et al. | 370/329 |
| 2003/0101357 A1 | 5/2003 | Ronen et al. | |
| 2003/0110385 A1 | 6/2003 | Golobrodsky et al. | |
| 2004/0008717 A1 | 1/2004 | Verma et al. | |
| 2004/0236702 A1 | 11/2004 | Fink et al. | |
| 2005/0060537 A1 * | 3/2005 | Stamos et al. | 713/156 |
| 2005/0238026 A1 * | 10/2005 | Wu et al. | 370/395.2 |
| 2006/0165060 A1 * | 7/2006 | Dua | 370/352 |
| 2007/0100773 A1 * | 5/2007 | Wallach | 705/75 |

FOREIGN PATENT DOCUMENTS

WO          02/17036 A2      2/2002

* cited by examiner

*Primary Examiner* — Asad Nawaz
*Assistant Examiner* — Stephanie Chang
(74) *Attorney, Agent, or Firm* — Hanley, Flight & Zimmerman, LLC

(57) ABSTRACT

Methods and apparatus for automatic security checking in systems that monitor for improper network usage are disclosed. An example system to mitigate improper network usage disclosed herein comprises an alert processor to determine whether to issue a notification in response to an activity alert corresponding to monitored usage of a communication network by a user device, wherein the monitored usage occurs after the user device has been granted access to the communication network, and an automatic verifier to respond to the activity alert by causing at least one of an automatic validation command or an automatic disconnect command to be sent to the user device before the alert processor determines whether to issue the notification.

16 Claims, 12 Drawing Sheets

METHODS AND APPARATUS FOR AUTOMATIC SECURITY CHECKING IN SYSTEMS THAT MONITOR FOR IMPROPER NETWORK USAGE

FIELD OF THE DISCLOSURE

This disclosure relates generally to communication network monitoring and, more particularly, to methods and apparatus for automatic security checking in systems that monitor for improper network usage.

BACKGROUND

Systems to mitigate improper network usage are deployed in service provider networks, business data centers, etc., to detect abnormal, suspicious, disapproved and/or fraudulent network usage associated with, for example, a customer's account, equipment, devices, etc. Early detection allows swift responsive action to mitigate the potential harm to the customer and/or the network caused by the abnormal, suspicious, disapproved and/or fraudulent network usage. For example, if the detected suspicious network usage is caused by account theft, device theft, network hijacking, etc., then early detection and quick responsive action can limit the damage and financial loss to both the customer and the service provider.

When suspicious activity is detected, an existing system to mitigate improper network usage alerts a customer care team or similar network operations staff. The customer care team then manually: 1) evaluates activity records associated with the triggered activity alert corresponding to the suspicious network usage; 2) contacts the affected customer to determine whether the network usage was improper; and 3) if improper usage is verified, suspends the customer's account, equipment, device(s), etc. The manual responsive action required by existing systems that mitigate improper network usage results in potentially significant operations costs. Furthermore, unnecessary operational costs can be incurred in the presence of "false alarms" which cause the customer care team to respond to activity alerts that are not related to underlying improper network usage.

DETAILED DESCRIPTION

Figure 1:
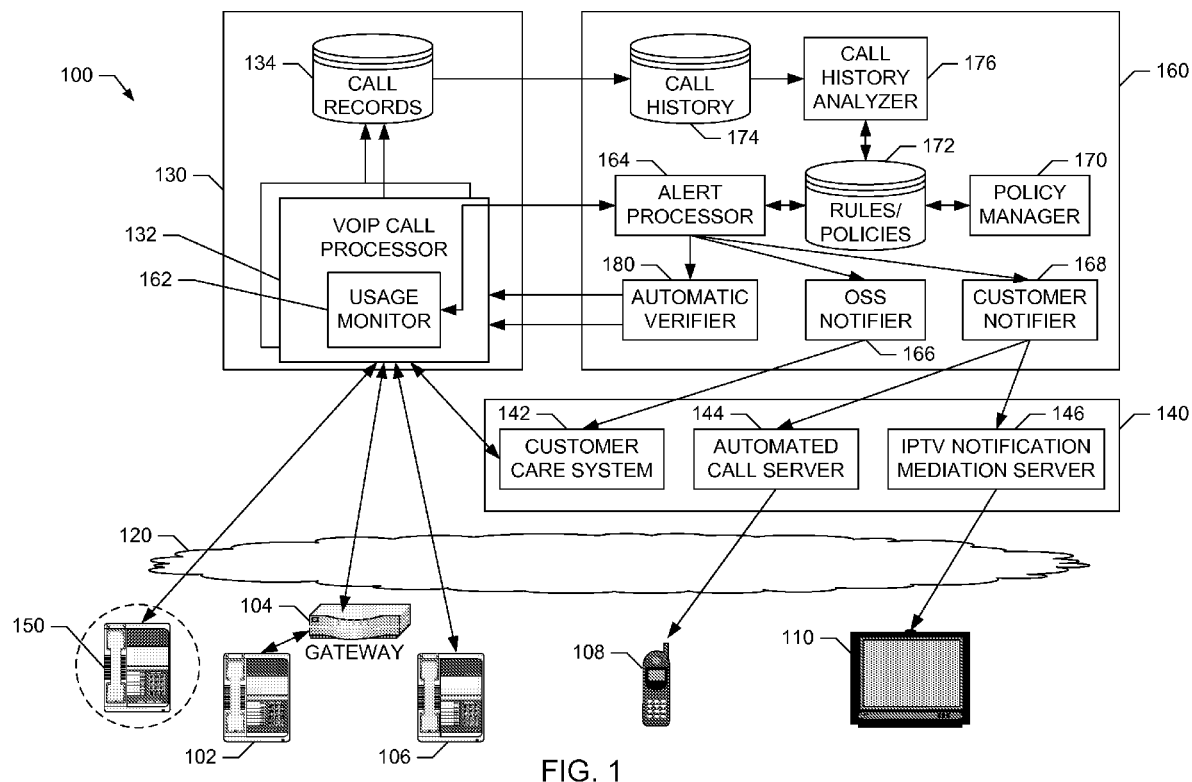
FIG. 1 is a block diagram of an example communication network that includes an example system to mitigate improper network usage disclosed herein.

Example methods and apparatus for automatic security checking to mitigate improper network usage are disclosed herein. The example automatic security checking methods and apparatus illustrated herein can be used in systems to mitigate improper network usage deployed in, for example, voice-over-internet-protocol (VoIP) networks, broadband networks, wireless networks, etc. The example automatic security checking methods and apparatus illustrated herein can be configured to function in conjunction with, for example, one or more account activity monitors, one or more policy rules engines and/or one or more other operations systems to reduce the probability of false alarms (and, thus, operational costs) associated with flagging non-improper network activity as potentially improper network activity. Such a reduction in the probability of false alarms may be accomplished without needing to reduce the sensitivity of the policy rules and, thus, without increasing the probability of failing to detect improper network activity.

In an example implementation of an improper usage mitigation system, an alert processor receives and processes activity alerts from one or more call processors in a communication network. The one or more call processors monitor the usage of the communication network by a user device. For example, the call processor(s) may monitor usage of the communication network by one or more user devices and issue an activity alert if the monitored usage is consistent with suspicious and/or potentially improper network events. The monitored usage that is employed by the call processor to determine whether to issue the activity alert may comprise call logs, call detailed records, etc., which are generated and stored by the call processor during normal call process management.

To process a received activity alert, an example alert processor compares the activity alert to a set of policy rules to determine whether to issue an improper usage notification in response to the received activity alert. The set of policy rules may be derived from a historical analysis of network activity within the protected communication network. Additionally or alternatively, the policy rules may be modified by an operator of the improper usage mitigation system. An example set of policy rules may define a set of policy conditions, each yielding a respective response by the example alert processor. Furthermore, to determine whether a policy condition has occurred, the example alert processor may employ one or more threshold counters to count one or more types of activity alerts to determine, for example, whether a predetermined number of activity alerts of a particular type have been received.

The automatic security checking methods and apparatus illustrated herein can be used in an example improper usage mitigation system to reduce the probability of issuing an improper usage notification when the monitored usage corresponding to the received activity alert is inconsistent with improper activity. Additionally or alternatively, the methods and apparatus illustrated herein may be used to increase the probability of issuing an improper usage notification and quickly protecting the communication network when the monitored usage is consistent with improper activity. In particular, the example automatic security checking methods and apparatus illustrated herein operate to automatically validate the user device associated with the received activity alert before issuing the improper usage notification. If validation of the user device is successful, the example alert processor does not need to issue an improper usage notification. However, if validation is unsuccessful, the example automatic security checking methods and apparatus illustrated herein then operate to automatically disconnect the user device from the network. If disconnection of the user device is not successful, the example alert processor issues the improper usage notification to alert, for example, the user of the user device and/or operators of the communication network of the occurrence of potentially improper activity associated with the user device. If, however, disconnection of the user device is successful, issuance of the improper usage notification by the example alert processor is optional and may be issued, for example, in accordance with the set of policy rules.

To perform the automatic validation and automatic disconnect operations of the example automatic security checking methods and apparatus illustrated herein, an example implementation of the improper usage mitigation system includes an automatic verifier. An example automatic verifier causes an automatic validation command to be sent to the user device in response to an activity alert received by the example alert processor and, for example, corresponding to a first policy condition. For example, the automatic verifier may generate a network-initiated re-authentication request to signal the call processor to initiate a re-authentication procedure with the user device. The first policy condition may comprise, for example, receiving an initial activity alert corresponding to any type of suspicious network activity as defined by the set of policy rules. Alternatively or additionally, the example automatic verifier causes an automatic disconnect command to be sent to the user device in response to an activity alert received by the example processor and, for example, corresponding to a second policy condition. For example, the automatic verifier may generate a network-initiated de-registration request to signal the call processor to initiate a de-registration procedure with the user device. The second policy condition may comprise, for example, receiving a subsequent activity alert corresponding to a failed validation of the user device, receiving an initial activity alert corresponding to a type of network activity defined by the policy rules to be particularly suspicious, etc.

To support issuing the improper usage notification, an example implementation of the improper usage mitigation system includes a notification interface to notify, for example, an operator and/or operation support system of the communication network that potentially improper activity has occurred. The operator and/or operation support system may then take appropriate action, such as, for example, commissioning a manual examination of the suspected network usage, suspending network access for the offending user device, etc. Furthermore, the example automatic verifier itself may be configured to cause network access for the offending user device to be suspended automatically, for example, in response to a failed automatic disconnect procedure. Additionally, the notification interface may be configured to notify the user of the offending user device of the potentially improper activity associated with that device. For example, the notification interface may enable an automated phone call to be sent to a contact phone number associated with the user and/or an error message to be displayed on a multimedia device associated with the user. The contact phone number may or may not be associated with the user device engaged in the suspicious activity. Similarly, the multimedia device may or may not be the user device engaged in the suspicious activity.

Some example implementations of the automatic security checking methods and apparatus disclosed herein utilize features provided by the session initiation protocol (SIP) defined for VoIP. SIP features may be used, for example, to implement the example automatic validation operation, the automatic disconnect operation and/or the improper usage notification operations of the example automatic security checking methods and apparatus illustrated herein.

Example automatic security checking methods and apparatus for improper usage mitigation systems are illustrated in FIG. 1 in the context of an example communication system 100. The example communication system 100 of FIG. 1 can be implemented by a service provider using any type of access communication system, such as, for example, a fiber optic communication system implementing Fiber to the Home or Fiber to the Curb (e.g., such as AT&T's Project Lightspeed), a digital subscriber line (DSL) communication system (e.g., such as a DSL system implemented using asymmetric DSL (ADSL), very high data rate DSL (VDSL), etc.), a cable television communication system, a satellite communication system, a microwave communication system, a mobile telephone communication system, a public switched telephone (PSTN) communication system, etc. The communication system 100 of the illustrated example is further configured to support call processing associated with VoIP telephony. However, persons having ordinary skill in the art will appreciate that the example automatic security checking methods and apparatus illustrated herein may be readily adapted to support call processing associated with other types of communication protocols and/or systems.

The example communication system 100 of FIG. 1 supports various types of customer premises equipment (CPE) devices served by one or more service providers. Supported CPE devices include a variety of VoIP user endpoint devices (UEs), such as, for example, an analog telephone 102 connected via an Analog Telephony Adapter (ATA) device 104, an internet protocol (IP) telephone 106, a soft telephone executing on a personal computer (not shown), etc. Other supported CPE devices include a mobile telephone 108 implemented by, for example, a dual-mode wireless/WiFi handheld device, a 2G, 2.5G and/or 3G wireless handheld device, and/or any other type of wireless device, a multimedia display 110 implemented by, for example, any type of television, monitor, computer, etc., as well as any other type of CPE devices not shown. The ATA device 104 may also implement, or be implemented by, other residential access devices, such as, for example, IEEE 802.11x access points, WiFi access points, WiMax access points, xDSL modems, AT&T Lightspeed Residential Gateways, etc.

The example communication system also includes one or more service access networks 120. The service access networks 120 may be implemented by, for example, IP data access networks, such as, xDSL access networks, Internet data access via cable multiple system operators (MSOs), etc. For example, AT&T's Lightspeed access network is an IP data access network that uses Fiber-to-the-x (FTTx) (e.g., Fiber to the Home) technology to provide broadband access for its customers. Other service access networks 120 may be implemented by, for example, 2G, 2.5G and/or 3G wireless networks, proprietary access networks, etc. Furthermore, some or all of the service access networks 120 may be implemented by a single physical layer technology, although logically separated according to traffic type. For example, cable networks use a common physical cable link to provide service access. In particular, cable systems utilize low frequency bands for Internet data access and utilize high frequency bands for video services. Similarly, AT&T's Lightspeed network provides integrated time division multiplexed (TDM) voice, VoIP voice, Internet data and/or video services via a single broadband network infrastructure based on gigabit passive optical network (GPON)/broadband passive optical network (BPON) technology.

To support VoIP services, the example communication system 100 includes a VoIP server complex 130. The VoIP server complex 130 of the illustrated example includes one or more VoIP call processors 132. The one or more VoIP call processors 132 implement various VoIP call processing functional modules. For example, the one or more VoIP call processors 132 may implement databases to store customer account and/or service provisioning information, such as the home subscriber server (HSS) defined by the third generation partnership project (3 GPP) IP multimedia system (IMS) standard. The one or more VoIP call processors 132 may also implement call session control functions that are responsible for call session set up between the calling and called party. Example call session control functions include the policy call session control function (P-CSCF), the interlocating call session control function (I-CSCF) and the serving call session control function (S-CSCF) as defined by the 3GPP IMS standard. Additionally, the one or more VoIP call processors 132 may implement VoIP call feature processors, such as the SIP feature servers defined by 3GPP IMS standard.

The VoIP server complex 130 may also include functionality (not shown) to implement media gateways, signaling gateways and/or gateway controllers. The media gateways, signaling gateways and/or gateway controllers provide connectivity and interworking between VoIP and other circuit switch-based telephony networks (e.g., such as PSTN and/or pre-3G wireless networks). The VoIP server complex 130 may also include media servers to provide ring tones, announcements and/or media mixing for multi-way calling and/or other calling features.

Additionally, the VoIP server complex 130 of the illustrated example supports billing data collection, for example, by collecting raw call detailed records (CDRs) from the one or more VoIP call processors 132 and storing the CDRs in one or more call record storage units 134. The VoIP server complex 130 of the illustrated example makes the CDRs stored in the one or more call record storage units 134 available to back office billing systems to generate, for example, customer billing records. Additionally, the VoIP server complex 130 of the illustrated example may provide VoIP customers with web access to various self-service capabilities, such as, for example, viewing call logs, changing feature configurations (e.g., enabling/disabling call forwarding, enabling/disabling call blocking, etc.). Although not shown, the VoIP server complex 130 of the illustrated example may be protected by firewalls, application-aware intrusion detection and protection equipment, and/or VPN routers for server site interconnections.

The example communication system 100 of the illustrated example further includes an operation support system (OSS) complex 140. The OSS complex 140 supports fault, configuration, accounting, performance and/or security functions, also known as the FCAPS functions. For example, the OSS complex 140 may include various network management systems (NMSs) to provide FCAPS support across the entire example communication network 100. Additionally, the OSS complex 140 may include service provisioning and/or customer account management systems responsible for order management, billing, service activation, service provisioning, etc.

With respect to the automatic security checking methods and apparatus of the illustrated example, the OSS complex 140 includes a customer care system 142 which is responsible for activities related to customer service support. Additionally, the OSS complex 140 of the illustrated example includes an automated call server 144 to place automated telephone calls to appropriate CPE devices (e.g., such as the mobile telephone 108) to play pre-recorded messages to network customers. Additionally or alternatively, the OSS complex 140 of the illustrated example includes an IPTV notification mediation server 146 to transmit multimedia information to appropriate CPE devices (e.g., such as the media device 110) for presentation to network customers. For example, the automated telephone calls and/or the multimedia information may be used to notify the network customers of various events, such as, for example, network outages, network features, potentially improper activity, etc.

To detect improper network activity (and/or, more generally, suspicious activity, disapproved activity, etc.) by a suspected "spoofing" device 150, the example communication system 100 includes an improper usage mitigation system 160. The example improper usage mitigation system 160 of FIG. 1 functions to detect network activity consistent with improper activity associated with spoofing devices 150. Furthermore, the example improper usage mitigation system 160 of FIG. 1 functions to notify the OSS complex 140 and/or the customer affected by the improper activity so that appropriate measures can be taken to frustrate any detected improper activity. For example, the example improper usage mitigation system 160 of FIG. 1 may protect against a spoofing device 150 accessing the VoIP service complex 130 from somewhere in the Internet by employing various hacking/theft techniques to compromise a valid customer's VoIP network service.

To provide monitoring capability for the example improper usage mitigation system 160 of FIG. 1, usage monitors 162 are deployed in the VoIP server complex 130 to monitor VoIP call usage. For example, the usage monitors 162 may be implemented in corresponding VoIP call processors 132 and/or implemented as separate functional units and associated with respective VoIP call processors 132 and/or other processing elements in the VoIP server complex 130. In some example implementations, the usage monitors 162 are call log collectors that forward all call logs (e.g., CDRs) collected and stored in, for example, the call record storage unit 134 to an alert processor 164 included in the improper usage mitigation system 160. Other example implementations of the usage monitors 162 are more advanced and can perform pre-filtering of the collected call logs (e.g., CDRs) and forward activity alerts associated with suspicious network activity to the alert processor 164.

The example improper usage mitigation system 160 shown in FIG. 1 includes the alert processor 164 to process monitored information (e.g., such as call logs, CDRs, activity alerts, etc.) from one or more usage monitors 162 deployed within the example communication network 100. The alert processor 164 receives the monitored usage information from the one or more usage monitors 162 and determines whether to trigger an improper usage notification indicating the occurrence of potentially improper network activity. When generated, the improper usage notification is routed to the appropriate recipient via an OSS notifier 166 and/or a customer notifier 168. The OSS notifier 166 is responsible for forwarding the improper usage notification to the customer care system 142 of the OSS complex 140, thereby notifying network operators of the potentially improper network activity. The customer notifier 168 is responsible for forwarding the improper usage notification to the automated call server 144 and/or the IPTV notification mediation server 146 of the OSS complex 140, thereby notifying the affected customer of the potentially improper activity.

For example, if a suspected spoofing device 150 gains access to the example communication system 100 by cloning the analog telephone 102 connected via the ATA device 104 and/or by cloning the IP telephone 106, the customer notifier 168 may cause an improper usage notification to be sent to the customer who is the owner of the analog telephone 102 or the IP telephone 106, respectively. The improper usage notification may be provided to the customer in the form of a pre-recorded message sent as an automated call from the automated call server 144 to the CPE device listed as the contact device for the customer (e.g., such as the mobile telephone 108). Additionally or alternatively, the improper usage notification may be provided to the customer in the form of a multimedia message sent from the IPTV notification mediation server 146 to one or more of the customer's CPE devices (e.g., such as the media device 110). Furthermore, the improper usage notification may be provided to the customer in a telephone call from a network operator/employee in response to an improper usage notification received by the customer care system 142.

A policy manager 170 included in the example improper usage mitigation system 160 provides criteria in the form of rules and policies that enable the alert processor 164 to employ a rule-based policy engine to determine whether network activity monitored by the one or more usage monitors 162 should trigger an improper usage notification. The policy manager 170 may include a user interface to enable an operator to create, modify, replace, remove, etc., rules and/or policies stored in a rule and policy storage unit 172 for use by the alert processor 164. For example, upon receipt of an activity alert from one of the usage monitors 162, the alert processor 164 may evaluate the activity alert using the rules and/or policies included in the rules and policies storage unit 172 to determine whether the monitored network usage corresponding to the activity alert is indicative of potentially improper activity. If the activity alert corresponds to potentially improper activity according to the rules and/or policies, the alert processor 164 issues an improper usage notification via the OSS notifier 166 and/or the customer notifier 168. Otherwise, the alert processor 164 may ignore the activity alert and/or return information to the usage monitor 162 that such monitored network usage is not indicative of potentially improper activity and, thus, should not trigger an activity alert.

In addition to the policy manager 170 for managing the rules and/or policies for identifying potentially improper activity, the example improper usage mitigation system 160 of FIG. 1 also employs historical analyses of prior network activity to determine rules and/or policies for the detection and prevention of improper network usage. To support such historical analyses, the example improper usage mitigation system 160 includes a call history storage unit 174. The call history storage unit 174 includes call logs (e.g., CDRs) corresponding to prior network activity and may be co-located with the improper usage mitigation system 160 and/or located at a remote network location (e.g., such as at the VoIP server complex 130). For example, the call history storage unit 174 may be implemented as a data warehouse accessible by the improper usage mitigation system 160. Additionally, the example improper usage mitigation system 160 includes a call history analyzer 176 to analyze the historical data included in the call history storage unit 174. The call history analyzer 176 then updates the rules and/or policies included in the rules and policies storage unit 172 based on its historical analyses. For example, the call history analyzer 176 may employ statistical analysis and/or other intelligent processing techniques to analyze the raw call history information (e.g., call logs/CDRs) stored in the call history storage unit 174 to identify characteristics of improper network activity. The determined characteristics may then be translated into rules and/or policies for the alert processor 164 to use when determining whether an activity alert corresponds to potentially improper network usage.

As discussed above, the example improper usage mitigation system 160 of FIG. 1 employs automatic security checking to reduce the probability of false alarms (e.g., to reduce instances when the alert processor 164 issues an improper usage notification in response to an activity alert corresponding to monitored network usage in which improper activity did not actually occur). To implement automatic security checking, the example improper usage mitigation system 160 of FIG. 1 includes an automatic verifier 180. In the improper usage mitigation system 160 of the illustrated example, the automatic verifier 180 is triggered by the alert processor 164 in response to an activity alert received from one of the usage monitors 162 and processed according to the rules and/or policies included in the rules and policies storage unit 172. The automatic verifier 180 then performs an automatic verification procedure before the alert processor 164 determines whether to issue an improper usage notification in response to the received activity alert. If, for example, a suspect device causing a received activity alert can be verified as legitimate by the automatic verifier 180, then the alert processor 164 does not need to issue an improper usage notification and, thus, a false alarm can be averted. If, however, verification by the automatic verifier 180 is unsuccessful (e.g., if the automatic verifier 180 cannot determine that the suspect device is legitimate), it is likely that the suspect device is associated with improper activity and, thus, the alert processor issues an improper usage notification in response to the received activity alert.

The automatic verification procedure implemented by the automatic verifier 180 of the illustrated example includes two procedures: an automatic validation procedure and an automatic disconnect procedure. As discussed below in greater detail, after evaluating the received activity alert according to the predetermined rules and/or policies, the alert processor 164 may command the automatic verifier 180 to send, for example, a request to the VoIP call processor 132 serving the suspect device (e.g., the spoofing device 150) to validate the authenticity of the suspect device or to disconnect the suspect device from the call processor 132. An example automatic validation procedure implemented by the automatic verifier 180 includes generating a network-initiated re-authentication request according to the session initiation protocol (SIP) defined for VoIP. The network-initiated re-authentication request is sent to the VoIP call processor 132 to cause the suspect device (e.g., the spoofing device 150) to perform a re-authentication procedure with the VoIP call processor 132. An example automatic disconnect procedure implemented by the automatic verifier 180 includes generating a network-initiated de-registration request according to the SIP protocol. The network-initiated de-registration request is sent to the VoIP call processor 132 to cause the suspect device (e.g., the spoofing device 150) to perform a de-registration procedure with the VoIP call processor 132. This de-registration procedure temporarily disconnects the suspect device (e.g., the spoofing device 150) from the call processor 132 and forces the suspect device (e.g., the spoofing device 150) to re-register with the example communication network 100 using a full authentication procedure.

Thus, the alert processor 164, in conjunction with the automatic verifier 180, the policy manager 170 and the call history analyzer 176, is capable of supporting any or all of the following responses to a received activity alert: (1) ignore, (2) log and take no action, (3) threshold watch, (4) auto-validation, (5) auto-disconnect, (6) OSS notification, (7) customer notification and/or (8) suspend device. For the ignore response, the alert processor 164 ignores the received activity alert according to the rules and/or policies included in the rules and policies storage unit 172. For the log and take no action response, the alert processor 164 stores the activity alerts but performs no other action in response to the received activity alert. For the threshold watch response, the alert processor 164 stores the activity alert, initializes or updates a threshold counter to track future occurrences of the corresponding type of activity alert and determines whether a threshold for that particular type of activity has been exceeded by the threshold counter.

For the auto-validation response, the alert processor 164 commands the automatic verifier 180 to cause, for example, the suspected spoofing device 150 to perform a validation procedure (e.g., such as a re-authentication procedure) with the VoIP call processor 132. The auto-validation response may occur in response to evaluating the received activity alert according to the predetermined rules and/or policies, and/or if a threshold counter configured to track a particular type of activity alert exceeds a threshold resulting in an "exceeded threshold" condition. For the auto-disconnect response, the alert processor 164 commands the automatic verifier 180 to cause a suspect device (e.g., the spoofing device 150) to perform a disconnect procedure (e.g., such as a de-registration procedure) with the VoIP call processor 132. The auto-disconnect response may occur in response to evaluating the received activity alert according to the predetermined rules and/or policies, and/or if a threshold counter tracking a particular type of activity alert exceeds a threshold resulting in an "exceeded threshold" condition, and/or if the result/outcome of the validation procedure (e.g., such as the re-authentication procedure) is unsatisfactory. The auto-disconnect response also causes the suspect device to re-register with the example communication network 100 (e.g., such as through a full authentication procedure).

For the OSS notification response and the customer notification response, the alert processor 164 issues an improper usage notification to the OSS notifier 166 and/or the customer notifier 168, respectively. The OSS notification response and/or the customer notification response may occur in response to evaluating the received activity alert according to the predetermined rules and/or policies, and/or if a threshold counter tracking a particular type of activity alert exceeds a threshold resulting in an "exceeded threshold" condition, and/or if the result/outcome of the disconnect procedure (e.g., such as the de-registration procedure) is unsatisfactory. The OSS notification response causes an improper usage notification to be issued via the customer care system 142, and the customer notification response causes improper usage notifications to be issued via the automated call server 144 and/or the IPTV notification mediation server 146.

For the suspend device response, the alert processor 164 commands the automatic verifier 180 to cause access to the communication network 100 to be, for example, suspended for the suspect device (e.g., the spoofing device 150). The suspend device response may occur in response to evaluating the received activity alert according to the predetermined rules and/or policies, and/or if a threshold counter tracking a particular type of activity alert exceeds a threshold resulting in an "exceeded threshold" condition, and/or if the result/outcome of the disconnect procedure (e.g., such as the de-registration procedure) is unsatisfactory. Once network access is suspended, the suspect device cannot re-register with the example communication network 100 absent intervention by the network custodian to rehabilitate the device (e.g., by resetting the suspended account associated with the suspect device).

Persons of ordinary skill in the art will appreciate that the improper usage mitigation system 160 of the illustrated example supports the escalation of responses to suspicious and/or potentially improper network activity based on the perceived severity of the received activity alert. In particular, the example improper usage mitigation system 160 of FIG. 1, through the automatic security checking capability provided by the automatic verifier 180, can react to suspicious network activity using automatic account verification procedures without potentially costly human intervention by network operators and/or the affected customer. As such, the automatic security checking capability provided by the automatic verifier 180 allows the example improper usage mitigation system 160 of FIG. 1 to be more sensitive and responsive to suspicious network activity without increasing the probability of false alarms because ambiguities regarding whether or not the suspicious activity corresponds to improper activity can be clarified through the validation and disconnect procedures implemented by the automatic verifier 180.

Figure 2A:
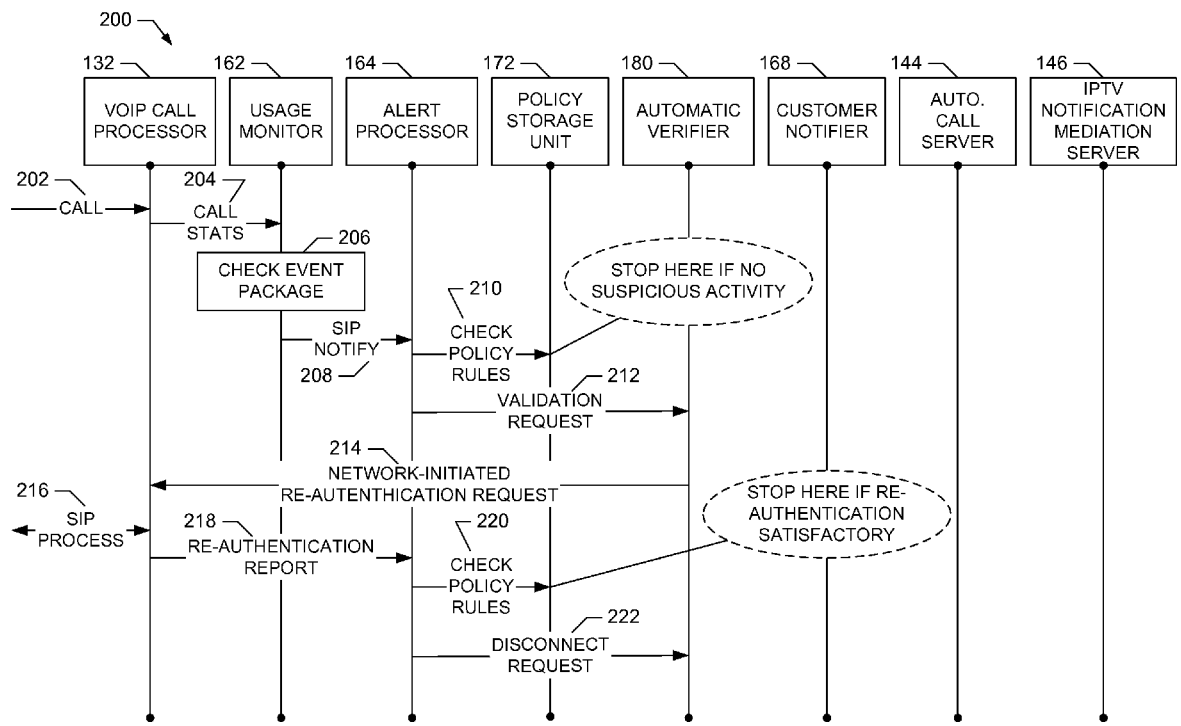
FIGS. 2A-2C collectively form an example message sequence diagram illustrating an example automatic security checking procedure that may be performed by the example system of FIG. 1.
Figure 2B:
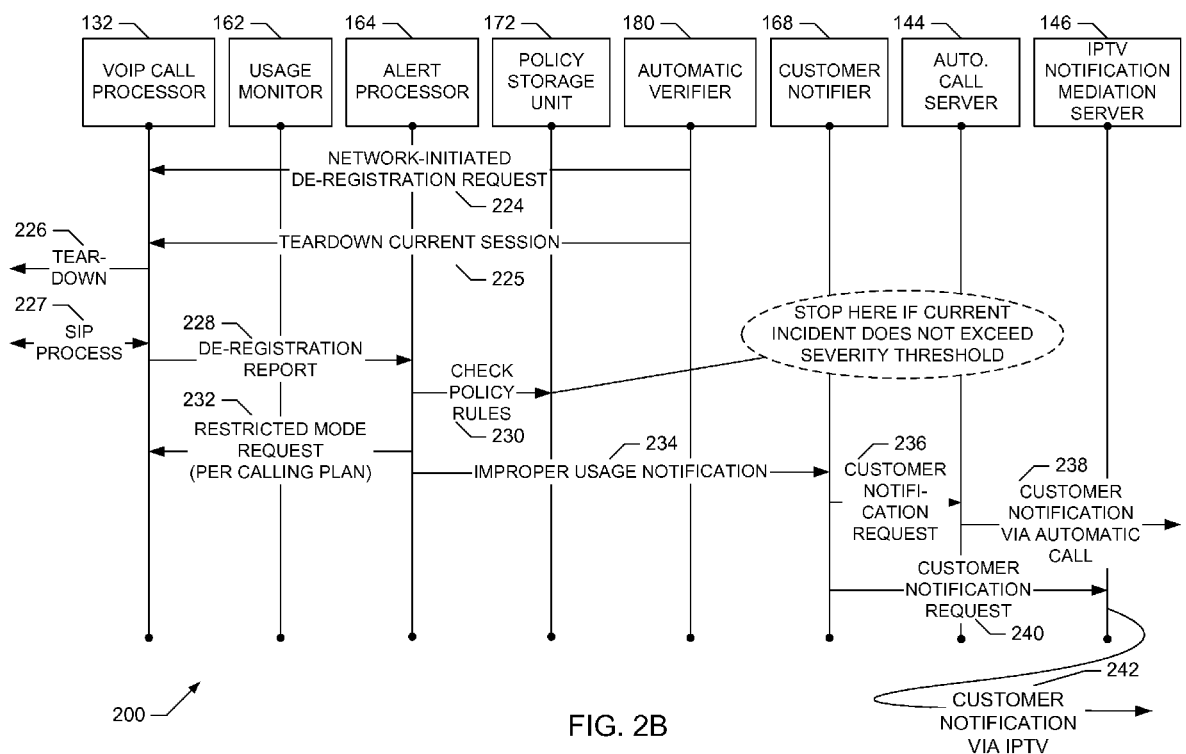
Figure 2C:
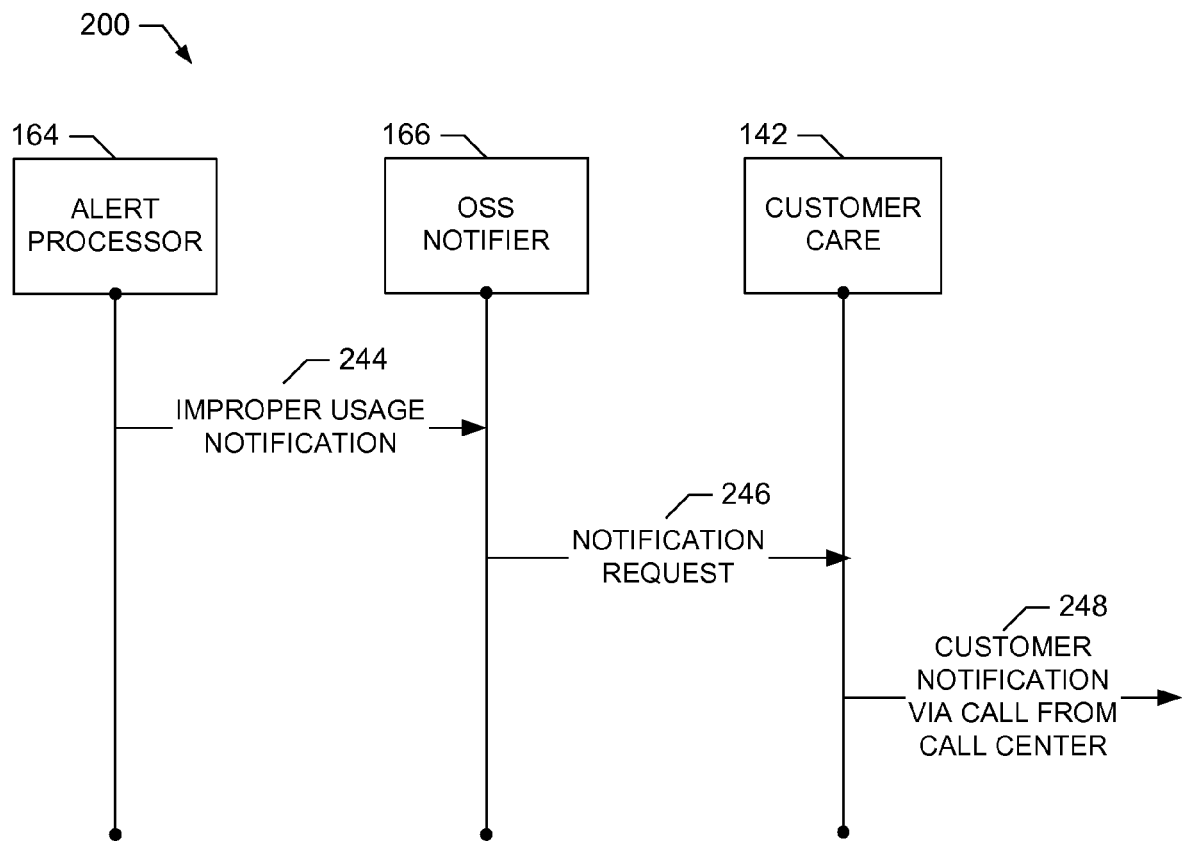

To more fully illustrate the operation of the example improper usage mitigation system 160 in the example communication system 100, an example message sequence diagram 200 illustrating an example automatic security checking procedure supported by the example improper usage mitigation system 160 of FIG. 1 is shown in FIGS. 2A-2C. The example message sequence diagram 200 begins with the VoIP call processor 132 of FIG. 1 establishing a call 202 for a CPE device (e.g., such as the analog telephone 102 connected via the ATA device 104, the IP telephone 106 or the suspected spoofing device 150). For the duration of the call 202, the VoIP call processor 132 generates call statistics 204 that enable the usage monitor 162 to monitor the network usage of the CPE device communicating with the VoIP call processor 132. If the usage monitor 162 and VoIP call processor 132 are implemented as separate devices, then the VoIP call processor 132 provides the call statistics 204 in the form of, for example, CDRs or call logs stored in the call record storage unit 134 and retrievable by the usage monitor 162. However, if the usage monitor 162 is implemented by the VoIP call processor 132, the usage monitor 132 may directly access the call statistics 204 in the form of raw network usage information generated by the VoIP call processor for inclusion in, for example, CDRs or call logs.

If the usage monitor 162 detects any suspicious network usage, it alerts the alert processor 164. In an example implementation, the VoIP call processor 132 implements and publishes a call usage event package based on Internet RFC 3265. In this example, the alert processor 164 also implements a standard SIP interface to support the SUBSCRIBE and NOTIFY methods specified in Internet RFC 3265. The alert processor 164 then SUBSCRIBES to the published call usage event package implemented by the VoIP call processor 132. For the duration of the call 202, the usage monitor 162 performs a check event package procedure 206 to monitor for events issued from the call usage event package. If an event occurs, the appropriate activity alert is made available to the alert processor 164 through the SIP NOTIFY message 208 using the NOTIFY method of the SIP protocol.

Upon receipt of the activity alert message from the usage monitor 162 (e.g., via the SIP NOTIFY message 208), the alert processor 164 performs a check policy rules procedure 210. Through the check policy rules procedure 210, the alert processor 164 evaluates the received activity alert according to pre-determined policies and/or rules to determine whether the activity alert corresponds to suspicious and/or improper network usage. As discussed above, the policies and/or rules may be created and/or updated based on analyses of historical network usage data. The policies and/or rules may be stored in, for example, the rules and policies storage unit 172 and managed by the policy manager 170.

If the alert processor 164 determines that the activity alert received from the usage monitor 162 does not correspond to suspicious and/or improper network usage based on the pre-determined policies and/or rules, the example message sequence diagram 200 stops and the received activity alert is ignored. However, if the alert processor 164 determines that the activity alert does correspond to suspicious and/or improper network usage, the alert processor 164 then sends a validation request message 212 to the automatic verifier 180 to command the automatic verifier 180 to cause the CPE device corresponding to the received activity alert to be validated with the example communication network 100. Receipt of the validation request message 212 causes the automatic verifier 180 of the illustrated example to send a network-initiated re-authentication request message 214 to the VoIP call processor 132 serving the CPE device. Receipt of the network-initiated re-authentication request message 214 causes the VoIP call processor 132 to invoke a SIP re-authentication process 216 with the CPE device corresponding to the activity alert.

Upon completion of the SIP re-authentication process 216, the VoIP call processor 132 sends a re-authentication report message 218 to the alert processor 164 to report the result of the attempt to re-authenticate the CPE device. The re-authentication report message 218 may be generated by the usage monitor 162 based on an event included in the call event package implemented by the VoIP processor 132. Alternatively, the VoIP processor 132 may implement a separate interface to generate the re-authentication report message 218. Upon receipt of the re-authentication report message 218, the alert processor 164 performs a check policy rules procedure 220 using the predetermined policies and/or rules to evaluate the results of re-authenticating (and, more generally, validating) the CPE device of interest.

If the alert processor 164 determines that the results of re-authenticating (and, more generally, validating) the suspect device are satisfactory based on the pre-determined policies and/or rules, the example message sequence stops and the received activity alert that triggered the validation of the corresponding CPE device is ignored and/or logged for historical analysis. However, if the alert processor 164 determines that the results of re-authenticating (and, more generally, validating) the suspect device are unsatisfactory, the alert processor 164 then sends a disconnect request message 222 to the automatic verifier 180 to command the automatic verifier 180 to cause the CPE device corresponding to the received activity alert to be disconnected from the example communication network 100. Receipt of the disconnect request message 222 causes the automatic verifier 180 of the illustrated example to send a network-initiated de-registration request message 224 (shown in FIG. 2B and continuing the message sequence diagram 200) to the VoIP call processor 132 serving the CPE device. The automatic verifier 180 also sends a teardown current session request 225 to the VoIP call processor 132 serving the CPE device.

Receipt of the teardown current session request 225 causes the VoIP call processor 132 to perform a teardown 226 of the current SIP session for the suspected CPE device. For example, the teardown 226 may involve sending control messages to the suspected CPE device and the remote device with which the CPE device is communicating to end the current call. Additionally, receipt of the network-initiated de-registration request message 224 causes the VoIP call processor 132 to invoke a SIP de-registration process 227 with the CPE device corresponding to the activity alert.

Upon completion of the SIP de-registration process 227, the VoIP call processor 132 sends a de-registration report message 228 to the alert processor 164 to report the result of the attempt to de-register the CPE device. The de-registration report message 228 may be generated by the usage monitor 162 based on an event included in the call event package implemented by the VoIP processor 132. Alternatively, the VoIP processor 132 may implement a separate interface to generate the de-registration report message 228. Upon receipt of the de-registration report message 228, the alert processor 164 performs a check policy rules procedure 230 using the predetermined policies and/or rules to evaluate the results of de-registering (and, more generally, disconnecting) the CPE device of interest.

If the alert processor 164 determines that the results of de-registration (and, more generally, disconnection) are satisfactory based on the pre-determined policies and/or rules, the example message sequence stops. The received activity alert that triggered the validation of the corresponding CPE device may then be ignored and/or logged for historical analysis. For example, the message sequence of the illustrated example stops if the alert processor 164 determines that the results of de-registration (and, more generally, disconnection) are satisfactory and the receipt of the activity alert does not cause a counter associated with the suspect CPE device and tracking that particular type of activity alert to exceed a severity threshold. However, if the alert processor 164 determines that the results of de-registration (and, more generally, disconnection) are unsatisfactory or a severity threshold, if applicable, is exceeded, the alert processor 164 then sends a restricted mode request message 232 to the VoIP call processor 132 serving the CPE device. The restricted mode request message 232 causes the VoIP call processor 132 to restrict access to the example communication network 100 for the CPE device and potentially suspends access to the network altogether for that particular device. Additionally, the alert processor 164 issues an improper usage notification 234 to the customer notifier 168.

Upon receipt of the improper usage notification 234, the customer notifier 168 sends a customer notification request message 236 to one or more appropriate network elements to notify the affected network customer of the potentially improper activity associated with the customer's CPE device (s). For example, the customer notifier 168 may send the customer notification request message 236 to the automated call server 144, thereby causing the automated call server 144 to provide a customer notification 238 via an automated telephone call to the customer's contact telephone number. Additionally or alternatively, the customer notifier 168 may send a customer notification request message 240 to the IPTV notification mediation server 146. The IPTV notification mediation server 146 uses, for example, AT&T's Lightspeed network to send a customer notification 242 via multimedia information transmitted to the customer's IPTV CPE device and/or any other appropriate CPE device (e.g., such as the multimedia display 110).

If the alert processor 164 determines that the results of de-registration (and, more generally, disconnection) are unsatisfactory and/or a severity threshold, if applicable, is exceeded, the alert processor 164 in the illustrated example also issues an improper usage notification 244 (shown in FIG. 2C and continuing the message sequence diagram 200) to the OSS notifier 166. Upon receipt of the improper usage notification 244, the OSS notifier 166 sends an operations notification request message 246 to the customer care system 142 to notify one or more network operators of the potentially improper activity associated with the customer's CPE device (s). The customer care system 142, in turn, may provide a customer notification 248 via a telephone call from a customer service representative to notify the affected network customer of the potentially improper activity associated with the customer's CPE device(s).

Figure 3:
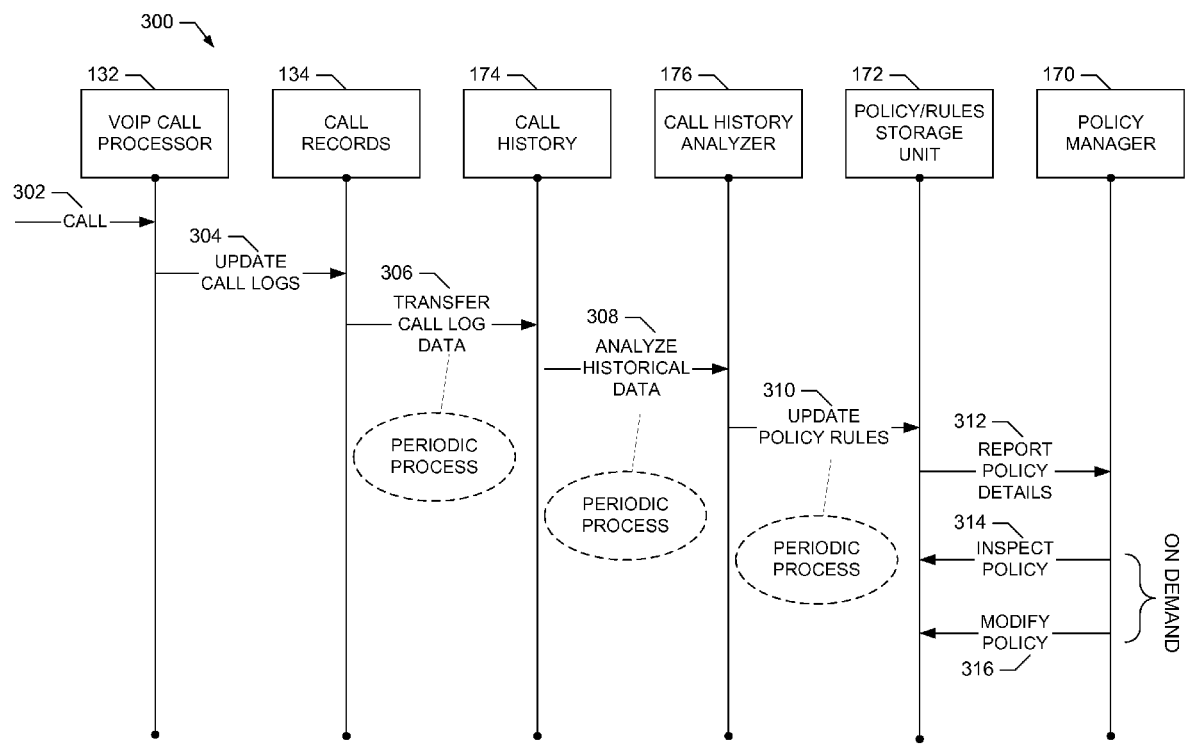
FIG. 3 is an example message sequence diagram illustrating an example policy rule determination procedure that may be performed by the example system of FIG. 1.

An example message sequence diagram 300 illustrating an example policy rule determination procedure that may be performed by the example improper usage mitigation system 160 of FIG. 1 to determine policies and/or rules for use by the alert processor 164 is shown in FIG. 3. The example message sequence diagram 300 begins with the VoIP call processor 132 of FIG. 1 establishing a call 302 for a CPE device (e.g., such as the analog telephone 102 connected via the ATA device 104, the IP telephone 106 or the suspected spoofing device 150). For the duration of the call 302, the VoIP call processor 132 generates call logs 304 (e.g., such as CDRs) for storage in the call record storage unit 134. The call logs 304 include call statistics characterizing the call 302. In the illustrated example, a transfer call log data process 306 is performed by the example improper usage mitigation system 160 at periodic intervals to transfer the call logs 304 stored in the call record storage unit 134 to the call history storage unit 174. As such, the call history storage unit 174 contains historical data regarding network usage associated with the VoIP call processor 132 and, more generally, the example communication system 100.

Next, the call history analyzer 176 of the illustrated example periodically performs an analyze historical data procedure 308 to analyze the historical data stored in the call history storage unit 174. The analyze historical data procedure 308 may include statistical algorithms, pattern matching techniques, etc., to ascertain characteristics of suspicious and/or improper network usage. Then, based on its analysis, the call history analyzer 176 of the illustrated example periodically performs an update policy rules procedure 310 to create and/or update rules and/or policies for suspicious and/ or improper activity detection. The resulting rules and/or policies are stored in the rules and policies storage unit 172.

At any appropriate time, the policy manager 170 may perform a report policy details procedure 312 to obtain the current policies and/or rules stored in the rules and policies storage unit 172. The policy manager 170 may also perform an inspect policy procedure 314 to access and/or inspect policies and/or rules as needed in, for example, an on-demand fashion. Additionally or alternatively, the policy manager 170 may perform (e.g., on demand) a modify policy procedure 316 to modify the existing, pre-determined policies and/or rules stored in the rules and policies storage unit 172.

Figure 4:
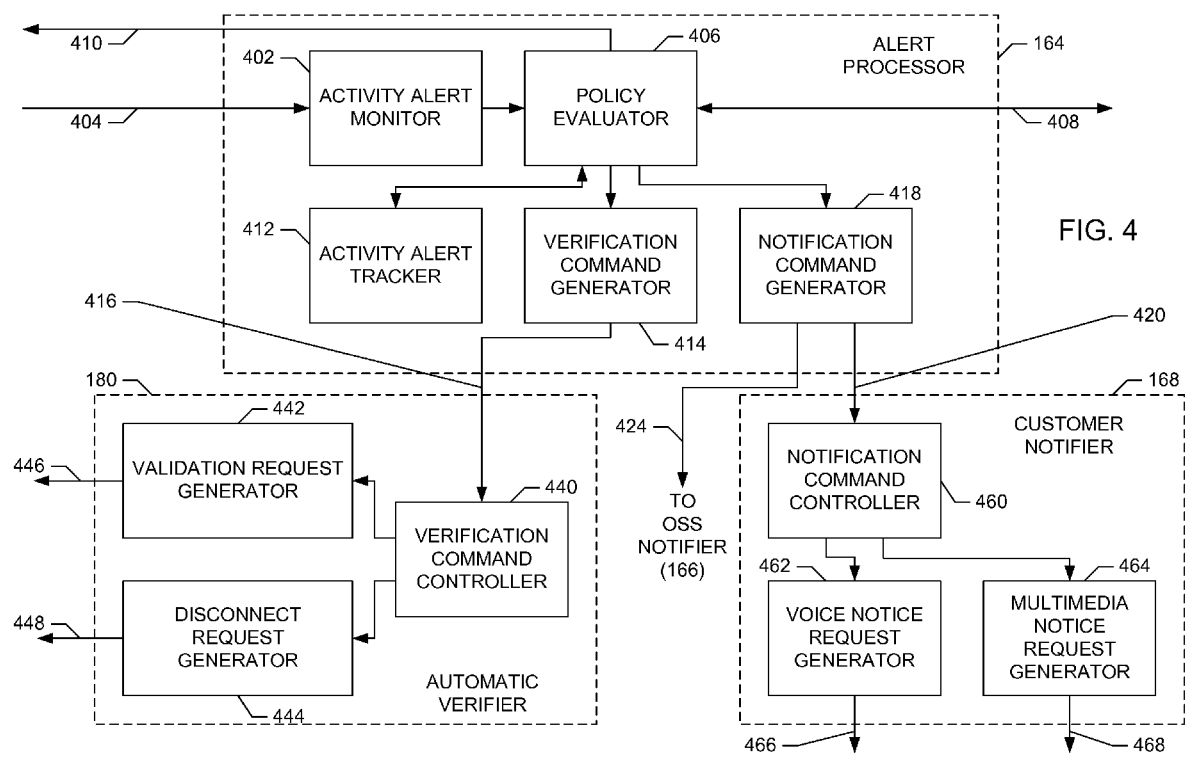
FIG. 4 is a block diagram of an example alert processor, an example automatic verifier and an example customer notifier that may be used to implement the example system of FIG. 1.

A block diagram of an example alert processor 164, an example automatic verifier 180 and an example customer notifier 168 that may be used to implement the example improper usage mitigation system 160 of FIG. 1 is shown in FIG. 4. The alert processor 164 of the illustrated example includes an activity alert monitor 402 to monitor for activity alerts received from, for example, the usage monitor 162 of FIG. 1 via an activity alert interface 404. In the illustrated example, the activity alert monitor 402 implements a standard SIP interface over the activity alert interface 404 to support the SUBSCRIBE and NOTIFY methods specified in Internet RFC 3265. The example activity alert monitor 402 then SUBSCRIBES to a published call usage event package implemented by a VoIP call processor associated with the usage monitor 162 (e.g., such as the VoIP call processor 132). Subsequently, the example activity alert monitor 402 monitors for activity alerts made available to the alert processor 164 by the usage monitor 162 through the NOTIFY method of the SIP protocol.

The example alert processor 164 of FIG. 4 also includes a policy evaluator 406. The policy evaluator 406 evaluates rules and/or policies from, for example, the rules and policies storage unit 172 and obtained via a policy rule interface 408. The policy evaluator 406 of the illustrated example is configured to compare characteristics of activity alerts received via the activity alert interface 404 to parameters, conditions, etc., of the rules and/or policies obtained via the policy rule interface 408. Based on its evaluation, the example policy evaluator 406 of FIG. 4 is also configured to update the obtained rules and/or policies via the policy rule interface 408. The policy evaluator 406 can also provide feedback to the usage monitor 162 via an activity alert feedback interface 410 to enable, for example, more accurate triggering of activity alerts by the usage monitor 162.

To support the policy evaluator 406, the example alert processor 164 of FIG. 4 further includes an activity alert tracker 412. The activity alert tracker 412 of FIG. 4 supports a logging response in which the activity alert tracker 412 logs activity alerts evaluated by the policy evaluator 406. Additionally or alternatively, the activity alert tracker 412 may support a threshold watch response in which the activity alert tracker 412 initializes or updates a threshold counter to track future occurrences of that particular type of activity alert and determines whether a threshold for the particular type of activity has been exceeded by the threshold counter. If the threshold is exceeded, the example activity alert tracker 412 of FIG. 4 indicates a threshold exceeded condition to the policy evaluator 406.

The example alert processor 164 of FIG. 4 also includes a verification command generator 414 to output an appropriate verification command via the verification command interface 416. The verification command is to be processed by the automatic verifier 180. The verification command generator 414 of the illustrated example supports two verification commands: a validation command and a disconnect command. The validation command instructs the automatic verifier 180 to cause a CPE device corresponding to an activity alert received by the alert processor 164 to be validated by the communication system 100 (e.g., by a serving call processor such as the VoIP call processor 132 of FIG. 1). The disconnect command instructs the automatic verifier 180 to cause a CPE device corresponding to the activity alert received by the alert processor 164 to be disconnected from by a serving call processor (e.g., from a serving call processor such as the VoIP call processor 132 of FIG. 1). After disconnection, the affected CPE device may be permitted to re-register with the example communication network 100 using a full authentication procedure.

Additionally, the example alert processor 164 of FIG. 4 includes a notification command generator 418 to output an improper usage notification via a notification interface 420 to the customer notifier 168 of FIG. 1. The notification command generator 418 of the illustrated example also includes a notification interface 424 to output the same or a different improper usage notification to the OSS notifier 166 of FIG. 1. The improper usage notification may include a variety of parameters concerning the particular activity alert evaluated by the policy evaluator 406, such as, for example, severity, frequency, device cloning information, activity alert tracking information, etc. The notification interfaces 420 and 424 may be implemented as, for example, a common interface to issue a single improper usage notification to all network elements to be notified of potentially improper network usage. Alternatively, the notification interfaces 420 and 424 may be implemented as, for example, separate interfaces to issue separate improper usage notifications to some or all of the network elements to be notified.

The automatic verifier 180 of the illustrated example includes a verification command controller 440 to monitor for one or more verification commands received from the example alert processor 164 via the verification command interface 416. The verification command controller 440 of the illustrated example supports two verification commands that may be received from the example alert processor 164: the validation command and the disconnect command, the details of which are discussed above in connection with the verification command generator 414. To process a validation command received by the verification command controller 440, the example automatic verifier 180 includes a validation request generator 442. To support a disconnect command received by the verification command controller 440, the example automatic verifier 180 includes a disconnect request generator 444.

The validation request generator 442 generates a validation request that is sent via a validation request interface 446 to, for example, the VoIP call processor 132. In the illustrated example, the validation request generated by the validation request generator 442 is a SIP network-initiated re-authentication request. The network-initiated re-authentication request is sent to the VoIP call processor 132 via the validation request interface 446 to cause, for example, a suspect device (e.g., the spoofing device 150) corresponding to the activity alert received by the alert processor 164 to perform a re-authentication procedure with the VoIP call processor 132. Similarly, the disconnect request generator 444 generates a disconnect request that is sent via a disconnect request interface 448 to, for example, the VoIP call processor 132. In the illustrated example, the disconnect request generated by the disconnect request generator 444 is a SIP network-initiated de-registration request. The network-initiated de-registration request is sent to the VoIP call processor 132 via the disconnect request interface 448 to cause, for example, the suspect device to perform a de-registration procedure with the VoIP call processor 132. This de-registration procedure temporarily disconnects the suspect device from the call processor 132 and forces that CPE device to re-register with the example communication network 100 using a full authentication procedure.

The customer notifier 168 of the illustrated example includes a notification command controller 460 to monitor for one or more improper usage notification commands received from the example alert processor 164 via the notification command interface 420. The notification command controller 460 of the illustrated example supports two notification commands that may be received from the example alert processor 164: a voice notice command and a multimedia notice command. To process a voice notice command received by the notification command controller 460, the example customer notifier 168 includes a voice notice request generator 462. To support a multimedia notice command received by the notification command controller 460, the example customer notifier 168 includes a multimedia notice request generator 464.

The voice notice request generator 462 of the illustrated example generates a voice notice request that is sent to, for example, the automated call server 144 of FIG. 1 via a voice notice request interface 466. The generated voice notice request causes the automated call server 144 to place one or more automated telephone calls to one or more appropriate CPE devices (e.g., such as the mobile telephone 108) associated with a customer who is affected by the potentially improper activity corresponding to the activity alert received by the alert processor 164. The automated telephone call(s) include a pre-recorded message and/or connect a live network operator to the affected customer. The multimedia notice request generator 464 of the illustrated example generates a multimedia notice request that is sent to, for example, the IPTV notification mediation server 146 of FIG. 1 via a multimedia notice request interface 468. The generated multimedia notice request causes the IPTV notification mediation server 146 to transmit multimedia information to appropriate CPE device(s) (e.g., such as the media device 110) for presentation to the network customer affected by the potentially improper activity. Persons of ordinary skill in the art will appreciate that the automated telephone call(s) and/or the multimedia information may be used to notify the network customer of various events, such as, for example, network outages, network features, potentially improper activity, etc.

Flowcharts representative of example machine readable instructions that may be executed to implement the example alert processor 164 of FIGS. 1 and/or 4, the example automatic verifier 180 of FIGS. 1 and/or 4, the example customer notifier 168 of FIGS. 1 and/or 4, and/or the example activity alert monitor 402, the example policy evaluator 406, the example activity alert tracker 412, the example verification command generator 414, the example notification command generator 418, the example verification command controller 440, the example validation request generator 442, the example disconnect request generator 444, the example notification command controller 460, the example voice notice request generator 462 and/or the example multimedia notice request generator 464 of FIG. 4 are illustrated in FIGS. 5A-5C, 6 and 7. In these examples, the machine readable instructions represented by one or more of the flowcharts may comprise one or more programs for execution by: (a) a processor, such as the processor 812 shown in the example computer 800 discussed below in connection with FIG. 8, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 812, but persons of ordinary skill in the art will readily appreciate that the entire program or programs and/or portions thereof could alternatively be executed by a device other than the processor 812 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the example alert processor 164, the example automatic verifier 180, the example customer notifier 168, the example activity alert monitor 402, the example policy evaluator 406, the example activity alert tracker 412, the example verification command generator 414, the example notification command generator 418, the example verification command controller 440, the example validation request generator 442, the example disconnect request generator 444, the example notification command controller 460, the example voice notice request generator 462 and/or the example multimedia notice request generator 464 could be implemented by any combination of software, hardware, and/or firmware. Also, some or all of the machine readable instructions represented by the flowcharts of FIGS. 5A-5C, 6 and 7 may be implemented manually. Further, although the example machine readable instructions are described with reference to the flowcharts illustrated in FIGS. 5A-5C, 6 and 7, persons of ordinary skill in the art will readily appreciate that many other techniques for implementing the example methods and apparatus described herein may alternatively be used. For example, with reference to the flowcharts illustrated in FIGS. 5A-5C, 6 and 7, the order of execution of the blocks may be changed, and/or some of the blocks described may be changed, eliminated, combined and/or subdivided into multiple blocks.

Figure 5A:
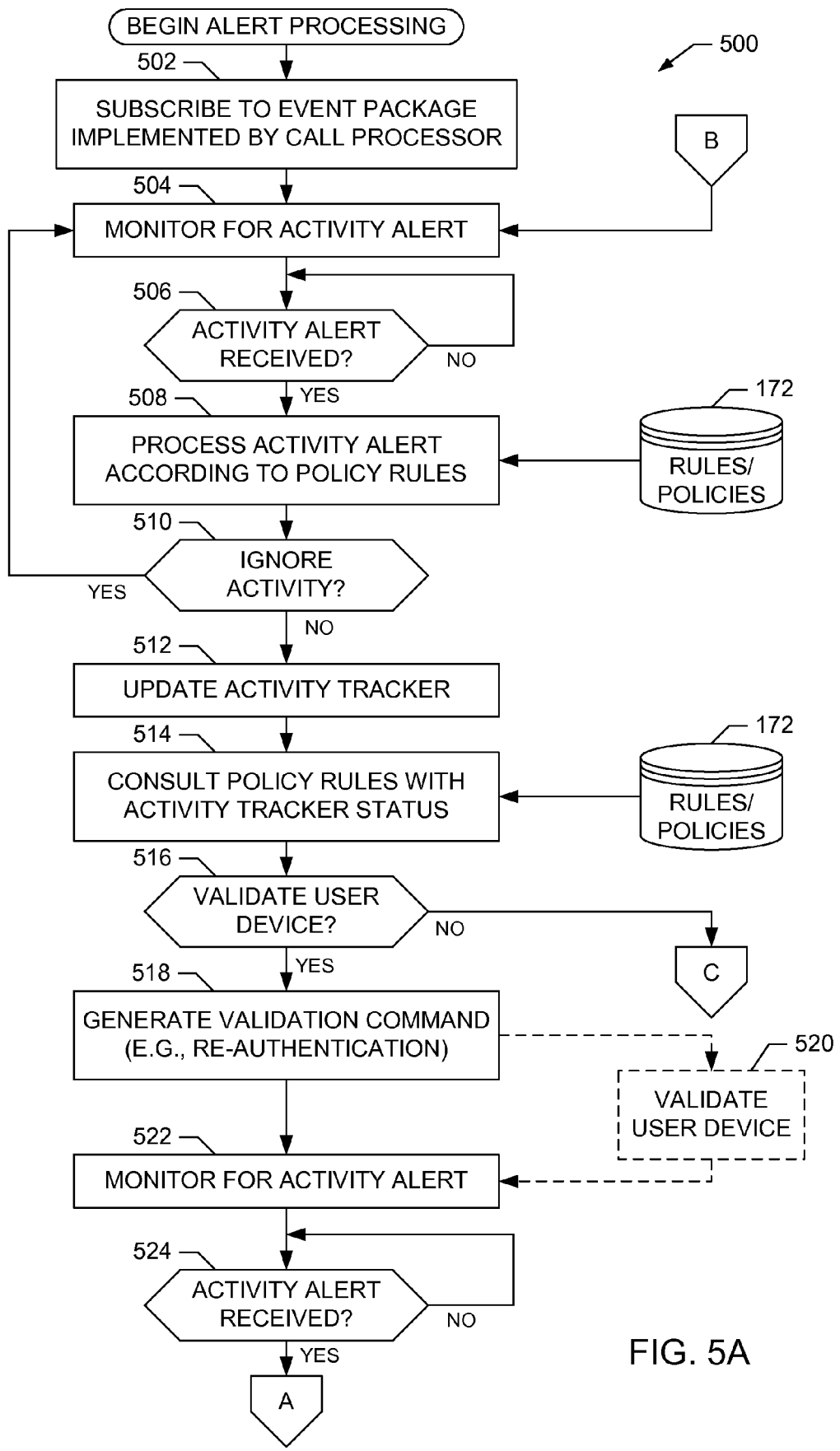
FIGS. 5A-5C collectively form a flowchart representative of example machine readable instructions that may be executed to implement the example alert processor of FIG. 4.
Figure 5B:
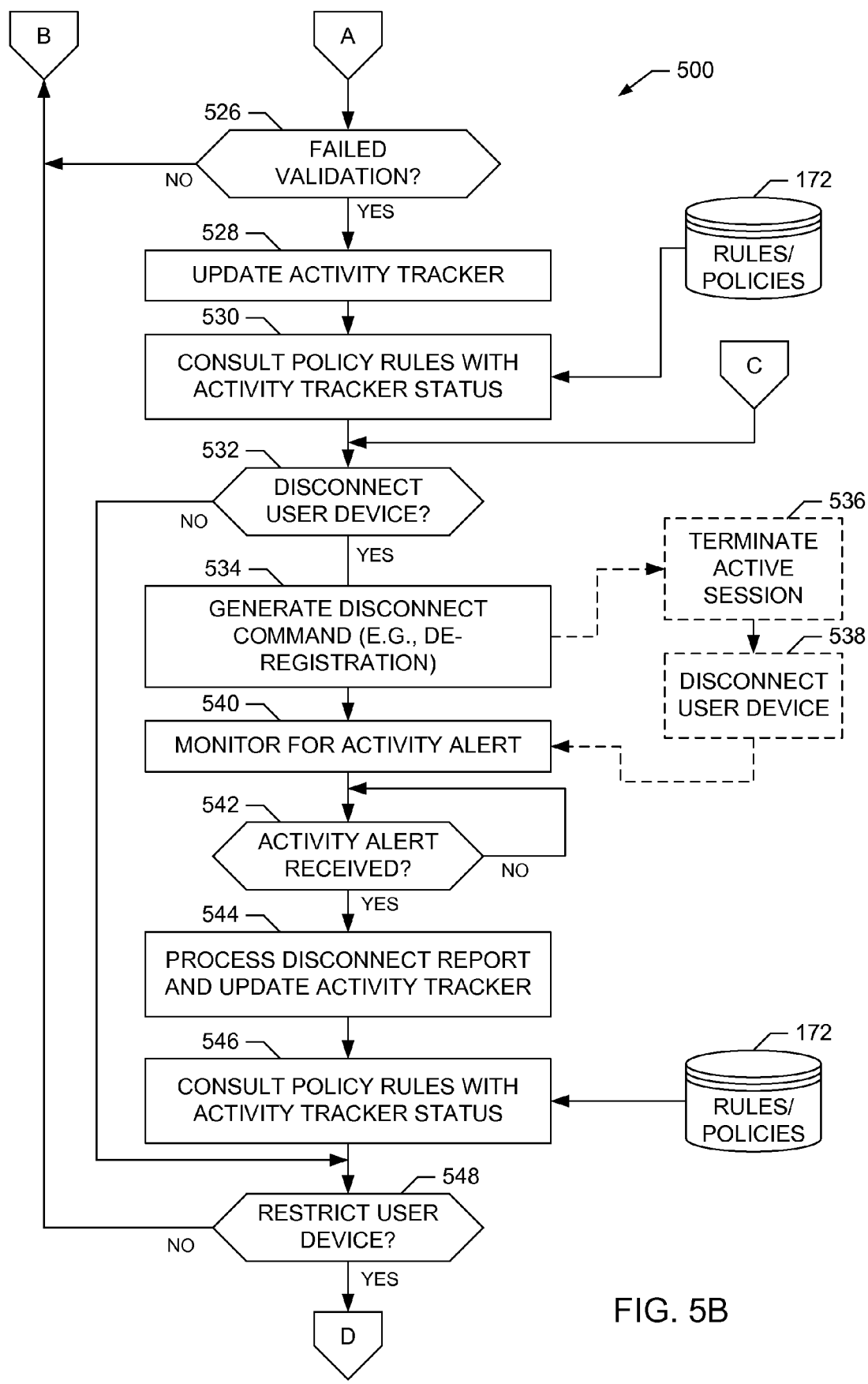
Figure 5C:
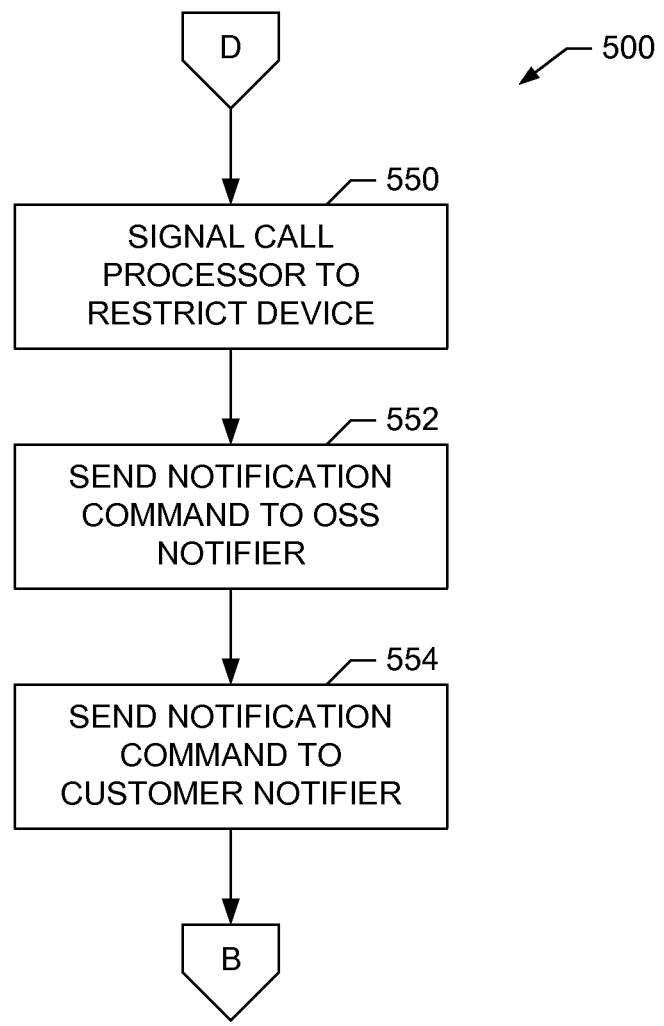

Example machine readable instructions 500 that may be executed to implement the example alert processor 164 of FIGS. 1 and/or 4 are shown in FIGS. 5A-5C. The example machine readable instructions 500 may be executed at predetermined intervals, based on an occurrence of a predetermined event, etc., or any combination thereof. For example, the machine readable instructions 500 may be executed upon start-up of the alert processor 164, at predetermined intervals, such as hourly, daily, etc. Additionally or alternatively, the example machine readable instructions 500 may be executed upon the occurrence of a trigger generated remotely, for example, at the VoIP server complex 130 whenever a VoIP call processor 132 is activated, publishes a call usage event package, etc.

The example machine readable instructions 500 begin execution at block 502 of FIG. 5A at which the alert processor 164 of FIGS. 1 and/or 4 subscribes to a call usage event package published by, for example, the VoIP call processor 132 to be monitored. For example, the activity alert monitor 402 of FIG. 4 included in the alert processor 164 may implement a standard SIP interface to support the SUBSCRIBE method specified in Internet RFC 3265 and then SUBSCRIBE to the call usage event package implemented and published by the VoIP call processor 132. Next, control proceeds to block 504 at which the alert processor 164 monitors for an activity alert from, for example, the usage monitor 162 that is monitoring network usage corresponding to the VoIP call processor 132. For example, the activity alert monitor 402 included in the alert processor 164 may implement a standard SIP interface to support the NOTIFY method specified in Internet RFC 3265 and then receive activity alerts from the usage monitor 162 through the NOTIFY method of the SIP interface. At block 506, the alert processor 164 continues monitoring for a received activity alert. If an activity alert is received (block 506), control then proceeds to block 508.

At block 508, the alert processor 164 evaluates the received activity alert according to pre-determined policies and/or rules stored in a rules and policies storage unit 172. As discussed above, the policies and/or rules may be created and/or updated based on historical analyses of prior network usage (e.g., in the form of call logs, CDRs, etc.) to determine network usage characteristics consistent with suspicious and/or improper network activity. Additionally or alternatively, the policy manager 170 may be used to create and/or modify the policies and/or rules stored in the rules and policies storage unit 172. Next, at block 510, the alert processor 164 determines whether the received activity alert should be ignored according to the evaluation of the policies and/or rules at block 508. For example, if the policy evaluator 406 included in the alert processor 164 determines that the activity alert should be ignored (block 510), control returns to block 504 and blocks subsequent thereto at which the alert processor 164 monitors for a subsequent activity alert.

However, if the policy evaluator 406 determines that the activity alert should not be ignored (block 510), control proceeds to block 512 at which, for example, the activity alert tracker 412 included in the alert processor 164 tracks the received activity alert. For example, at block 512, the activity alert tracker 412 may update a tracking counter for the type of activity alert currently being processed. Control then proceeds to block 514 at which, for example, the activity alert tracker 412 consults the policies and/or rules stored in the rules and policies storage unit 172 to determine whether the CPE device associated with the activity alert should be validated in response to the received activity alert. For example, the policies and/or rules stored in the rules and policies storage unit 172 may indicate that the CPE device should be validated if the frequency of occurrence of the type of activity alert being processed exceeds a threshold (e.g., and, thus, causes an exceeded threshold condition). Control then proceeds to block 516.

At block 516, the alert processor 164 determines whether the CPE device associated with the received activity alert requires validation. If the CPE device does not require validation (block 516), control proceeds to block 532 of FIG. 5B to allow, for example, the CPE device to be disconnected without any further validation based on the policies and/or rules consulted at block 514. The processing at block 532 is discussed in greater detail below. If, however, the CPE device associated with the received activity alert does require validation (block 516), control proceeds to block 518. At block 518, the alert processor 164 generates a validation command to cause the automatic verifier 180 to, for example, generate a network-initiated re-authentication request to validate the CPE device suspected of improper network usage based on the received activity alert (e.g., such as the suspected spoofing device 150). The validation of the CPE device is performed by, for example, the VoIP call processor 132 as illustrated by block 520.

After the validation command is generated at block 518, control proceeds to block 522 at which the alert processor 164 again monitors for an activity alert from, for example, the usage monitor 162 that is monitoring network usage corresponding to the VoIP call processor 132. However, at block 522, the alert processor 164 is monitoring for an activity alert in response to the validation of the CPE device by, for example, the VoIP call processor 132 (block 520). At block 524, the alert processor 164 continues monitoring for a received activity alert. If an activity alert is received (block 524), control then proceeds to block 526 of FIG. 5B. Persons having ordinary skill in the art will appreciate that the processing at block 522 and 524 (and, more generally, for the example machine readable instructions 500 in their entirety) may be implemented, for example, via a single-threaded process or a multi-threaded process. In the case of a multi-threaded implementation, separate threads may be executed for each type of activity alert being monitored.

Turning to FIG. 5B, at block 526, the alert processor 164 determines whether the received activity alert corresponds to a failed validation of the CPE device associated with the previously received activity alert. If the alert processor 164 determines that the activity alert does not correspond to a failed validation (block 526) and, thus, corresponds to a successful validation, control returns to block 504 of FIG. 5A and blocks subsequent thereto at which the alert processor 164 monitors for a subsequent activity alert. However, if the alert processor 164 determines that the activity alert does correspond to a failed validation (block 526), control proceeds to block 528 at which, for example, the activity alert tracker 412 included in the alert processor 164 tracks the received activity alert corresponding to a validation failure. For example, at block 528, the activity alert tracker 412 may update a tracking counter for validation failure activity alerts. Control then proceeds to block 530 at which, for example, the activity alert tracker 412 consults the policies and/or rules stored in the rules and policies storage unit 172 to determine whether the CPE device associated with the validation failure should be disconnected in response to the received activity alert. For example, the policies and/or rules stored in the rules and policies storage unit 172 may indicate that the CPE device should be disconnected if the frequency of validation failures exceeds a threshold (e.g., and, thus, causes an exceeded threshold condition). Control then proceeds to block 532.

At block 532, the alert processor 164 determines whether the CPE device associated with the validation failure should be disconnected. If the CPE device does not require disconnection (block 532), control proceeds to block 548 to allow, for example, network access for the CPE device to be restricted without disconnection based on the polices and/or rules consulted at block 530. The processing at block 548 is discussed in greater detail below. If, however, the CPE device associated with the validation failure does require disconnection (block 532), control proceeds to block 534. At block 534, the alert processor 164 generates a disconnect command to cause the automatic verifier 180 to, for example, generate a network-initiated de-registration request to disconnect the CPE device (e.g., such as the suspected spoofing device 150) associated with the validation failure from the example communication network 100. The disconnect command generated at block 534 may cause, for example, the VoIP call processor 132 serving the CPE device to terminate any active sessions associated with the CPE device, as illustrated by block 536. The disconnect command also causes, for example, the VoIP call processor to disconnect the user device from the network, as illustrated by block 538.

After the validation command is generated at block 534, control proceeds to block 540 at which the alert processor 164 again monitors for an activity alert from, for example, the usage monitor 162 that is monitoring network usage corresponding to the VoIP call processor 132. However, at block 540, the alert processor 164 is monitoring for an activity alert in response to the disconnection of the CPE device by, for example, the VoIP call processor 132 (block 538). At block 542, the alert processor 164 continues monitoring for a received activity alert. If an activity alert is received (block 542), control then proceeds to block 544. Persons having ordinary skill in the art will appreciate that the processing at block 540 and 542 (and, more generally, for the example machine readable instructions 500 in their entirety) may be implemented, for example, via a single-threaded process or a multi-threaded process. In the case of a multi-threaded implementation, separate threads may be executed for each type of activity alert being monitored.

Returning to FIG. 5B, at block 544, the alert processor 164 processes the received activity alert containing the disconnection report resulting from the disconnection of the CPE device by the VoIP call processor 132 at block 538. Also at block 544, the activity alert tracker 412 included in the alert processor 164 tracks the received activity alert containing the disconnection report. For example, at block 544, the activity alert tracker 412 may update a tracking counter for disconnection reports. Control then proceeds to block 546 at which, for example, the activity alert tracker 412 consults the policies and/or rules stored in the rules and policies storage unit 172 to determine whether the CPE device associated with the disconnection report should have its network access restricted. For example, the policies and/or rules stored in the rules and policies storage unit 172 may indicate that network access restriction is appropriate if the frequency of disconnections exceeds a threshold (e.g., and, thus, causes an exceeded threshold condition). Control then proceeds to block 548.

At block 548, the alert processor 164 determines whether network access for the CPE device associated with the disconnection report should be restricted. If restriction is not required (block 548), control returns to block 504 of FIG. 5A and blocks subsequent thereto at which the alert processor 164 monitors for a subsequent activity alert. If, however, network access for the CPE device is to be restricted (block 548), control proceeds to block 550 of FIG. 5C. At block 550, the alert processor 164 signals, for example, the VoIP call processor 132 to restrict network access for the failed CPE device (e.g., such as the spoofing device 150) corresponding to the disconnection report. Restriction of network access may include a complete suspension of network access privileges or a reduction in network access features according to the affected customer's service plan.

Next, control then proceeds to block 552 at which the alert processor 164 issues an improper usage notification to the OSS notifier 166. For example, at block 552, the notification command generator 418 may generate an improper usage notification to be received by the OSS notifier 166 to alert the network operator(s), and possibly the affected customer(s), of the potentially improper network activity, thereby allowing appropriate mitigation measures to be taken. Control then proceeds to block 554 at which the alert processor 164 issues an improper usage notification to the customer notifier 168. For example, at block 554, the notification command generator 418 may generate an improper usage notification to be received by the customer notifier 168 to alert the affected customer(s) of the potentially improper network activity, thereby allowing appropriate mitigation measures to be taken. Control then returns to block 504 of FIG. 5A and blocks subsequent thereto at which the alert processor 164 monitors for a subsequent activity alert.

Figure 6:
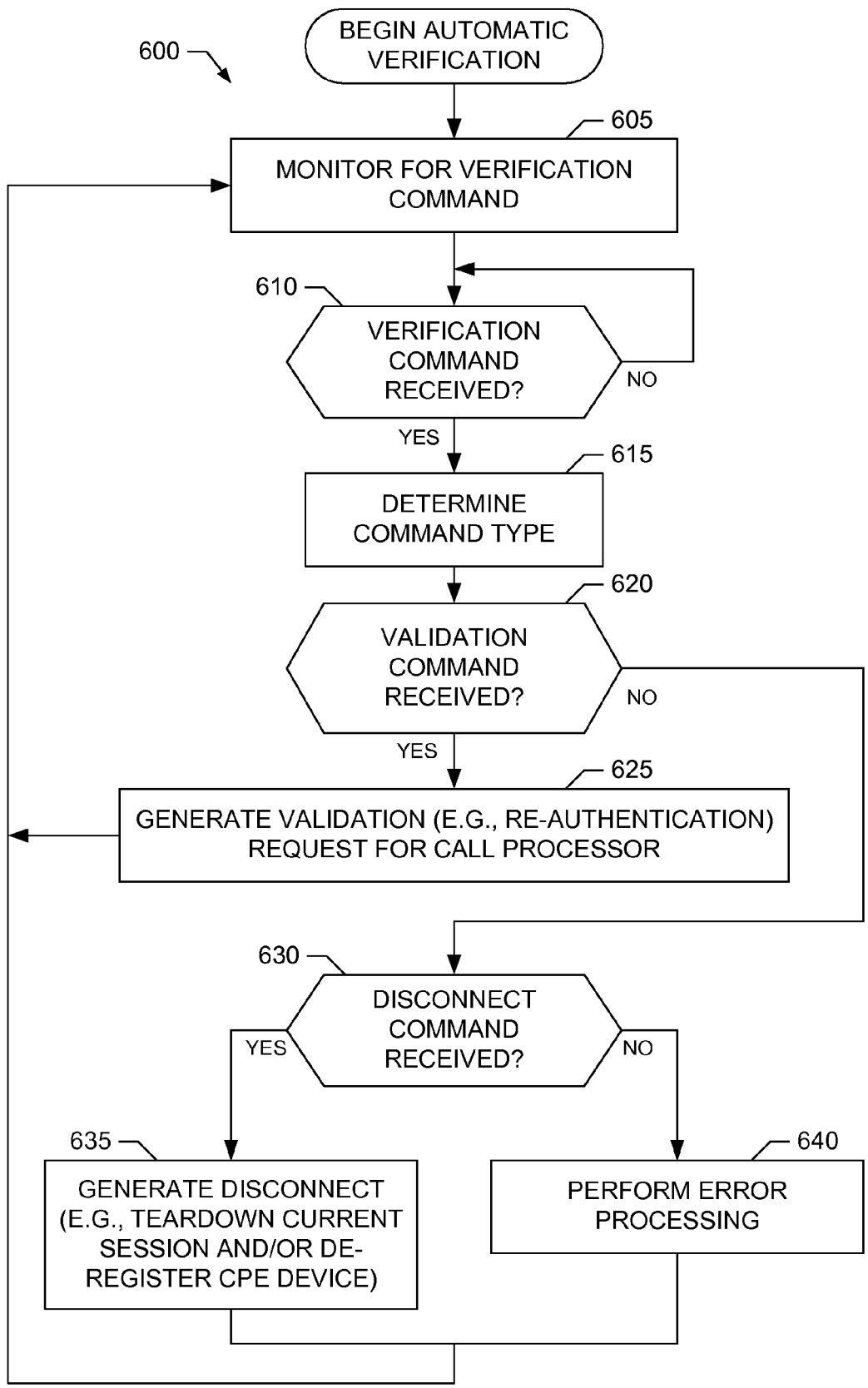
FIG. 6 is a flowchart representative of example machine readable instructions that may be executed to implement the example automatic verifier of FIG. 4.

Example machine readable instructions 600 that may be executed to implement the example automatic verifier 180 of FIGS. 1 and/or 4 are shown in FIG. 6. The example machine readable instructions 600 may be executed at predetermined intervals, based on an occurrence of a predetermined event, etc., or any combination thereof. For example, the machine readable instructions 600 may be executed upon start-up of the automatic verifier 180, at predetermined intervals, such as hourly, daily, etc. Additionally or alternatively, the example machine readable instructions 600 may be executed upon the occurrence of a trigger remotely generated, for example, by the improper usage mitigation system 160 whenever the alert processor 164 is restarted, etc.

The example machine readable instructions 600 begin execution at block 605 at which the automatic verifier 180 of FIGS. 1 and/or 4 monitors for a verification command received from, for example, the alert processor 164. For example, at block 605, the verification command controller 440 included in the automatic verifier 180 of FIG. 4 monitors for receipt of either the validation command or the disconnect command from the alert processor 164. At block 610, the automatic verifier 180 continues monitoring for a received verification command. If a validation command is received (block 610), control then proceeds to block 615.

At block 615, the automatic verifier 180 determines which type of verification command was received from the alert processor 164. For example, the two possible verification commands of the illustrated example are: (1) a validation command, such as a re-authentication command and (2) a disconnect command, such as a de-registration command. If, for example, at block 620, the verification command controller 440 determines that a validation command was received, control proceeds to block 625 at which the automatic verifier 180 generates a validation request for the call processor serving the CPE device (e.g., such as the suspected spoofing device 150) suspected of improper network activity. For example, at block 625, the validation request generator 442 included in the automatic verifier 180 generates a SIP network-initiated re-authentication request that is sent to the VoIP call processor 132 serving the suspect device. A re-authentication request causes the VoIP call processor 132 to invoke a re-authentication procedure with the suspect device. Control then returns to block 605 and blocks subsequent thereto at which the automatic verifier 180 monitors for a subsequent verification command received from, for example, the alert processor 164.

If, however, the verification command controller 440 determines that a validation command has not been received (block 620), then at block 630, the verification command controller 440 determines whether a disconnect command was received from the alert processor 164. If a disconnect command was received (block 630), control proceeds to block 635 at which the automatic verifier 180 generates a disconnect request for the call processor serving the CPE device suspected of disapproved network activity (e.g., such as the suspected spoofing device 150). For example, at block 635, the disconnect request generator 444 included in the automatic verifier 180 generates a SIP network-initiated de-registration request that is sent to the VoIP call processor 132 serving the suspect device. The de-registration request causes the VoIP call processor 132 to invoke a de-registration procedure with the suspect device. Additionally or alternatively, the disconnect request generator 444 generates a teardown current session request to cause the VoIP call processor 132 to teardown any current SIP sessions associated with the suspected CPE device.

However, if a disconnect command has not been received (block 630), control proceeds to block 640 at which the automatic verifier 180 performs any type of appropriate error processing because the received command did not correspond to one of the two possible verification commands. Then, after processing at either block 635 or block 640 completes, control returns to block 605 and blocks subsequent thereto at which the automatic verifier 180 monitors for a subsequent verification command received from, for example, the alert processor 164.

Figure 7:
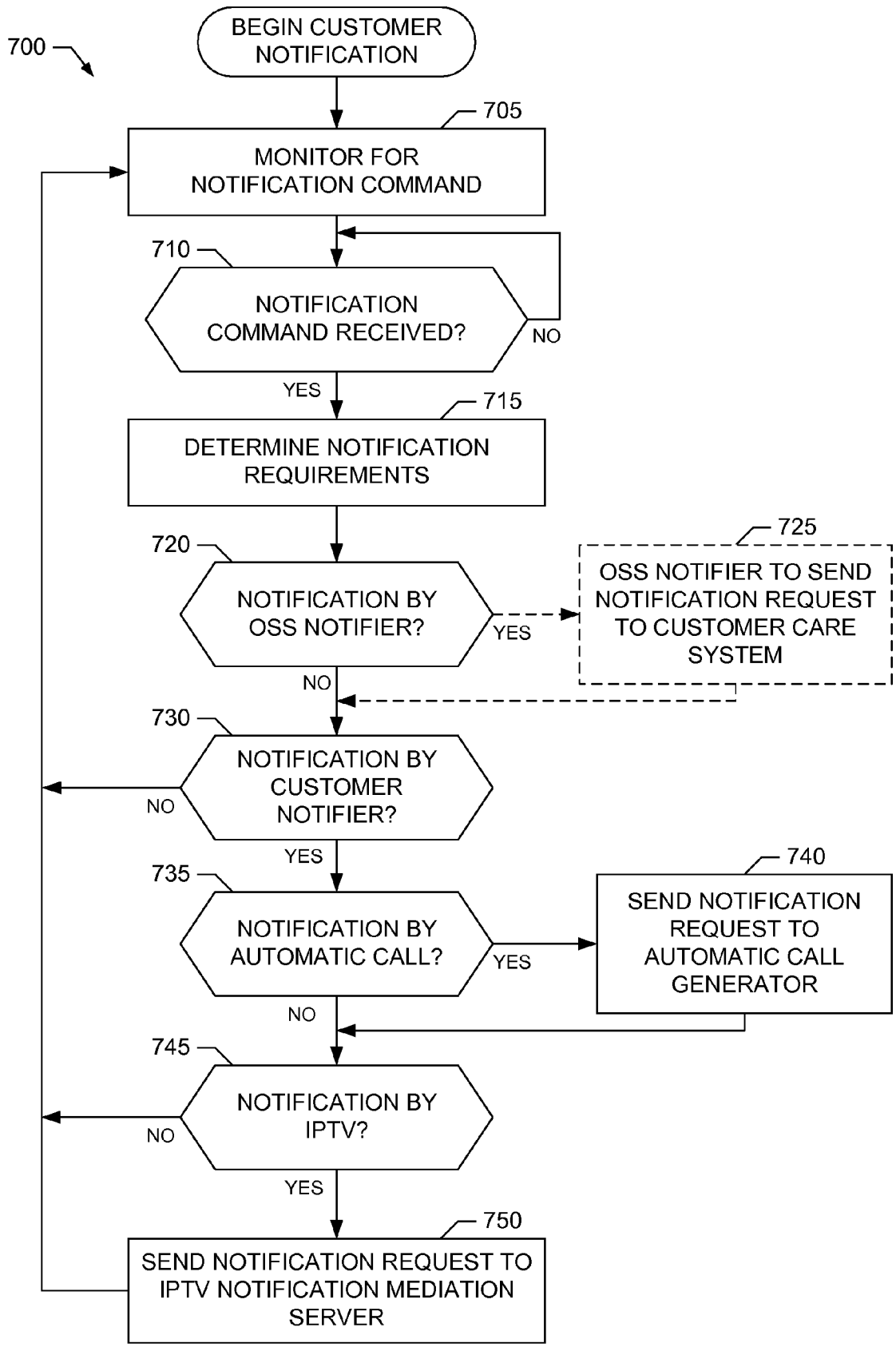
FIG. 7 is a flowchart representative of example machine readable instructions that may be executed to implement the example customer notifier of FIG. 4.

Example machine readable instructions 700 that may be executed to implement the example customer notifier 168 of FIGS. 1 and/or 4 are shown in FIG. 7. The example machine readable instructions 700 may be executed at predetermined intervals, based on an occurrence of a predetermined event, etc., or any combination thereof. For example, the machine readable instructions 700 may be executed upon start-up of the customer notifier 168, at predetermined intervals, such as hourly, daily, etc. Additionally or alternatively, the example machine readable instructions 700 may be executed upon the occurrence of a trigger remotely generated, for example, by the improper usage mitigation system 160 whenever the alert processor 164 is restarted, etc.

The example machine readable instructions 700 begin execution at block 705 at which the customer notifier 168 of FIGS. 1 and/or 4 monitors for an improper usage notification received from, for example, the alert processor 164. For example, at block 705 the notification command controller 460 included in the customer notifier 168 of FIG. 4 monitors for receipt of an improper usage notification broadcast generally to all appropriate network elements and/or an improper usage notification targeted specifically for the customer notifier 168. If an improper usage notification command is received (block 710), control proceeds to block 715. Otherwise, the notification command controller 460 continues to await a notification.

At block 715, the customer notifier 168 determines the notification requirements for the improper usage notification command received from the alert processor 164. For example, at block 720, the notification command controller 460 determines whether the improper usage notification command requires notification via the OSS notifier 166 and/or the customer notifier 168. For example, notification via the OSS notifier may be required to enable network operator(s) to be notified of the improper network usage associated with the improper usage notification command. If the notification requirements indicate that notification via the OSS notifier 166 is required (block 720), the OSS notifier 166 will be responsible for sending the appropriate notification requests to the customer care system 142, as illustrated by block 725.

Next, control proceeds to block 730 at which the notification command controller 460 determines whether the improper usage notification command also requires that a customer affected by the potentially improper activity be notified via the customer notifier 168. If the notification requirements indicate that notification via the customer notifier 168 is not required (block 730), control returns to block 705 and blocks subsequent thereto at which the customer notifier 168 monitors for a subsequent improper usage notification command received from, for example, the alert processor 164. However, if notification via the customer notifier 168 is required (block 730), control proceeds to block 735.

At block 735, the notification command controller 460 determines whether customer notification is to be achieved through the use of one or more automated calls to, for example, the customer's contact telephone number(s). If notification by an automated call is required (block 735), control proceeds to block 740 at which the customer notifier 168 generates a request for customer notification via an automated voice call. For example, at block 740, the voice notice request generator 462 included in the customer notifier 168 generates a voice notice request that is sent to, for example, the automated call server 144 of FIG. 1. The generated voice notice request causes the automated call server 144 to place one or more automated telephone calls to one or more appropriate CPE devices (e.g., such as the mobile telephone 108) associated with a customer who is affected by the improper activity. Control then proceeds to block 745.

At block 745, the notification command controller 460 determines whether the improper usage notification command required notification via a multimedia presentation. If notification by a multimedia presentation is required (block 745), control proceeds to block 750 at which the customer notifier 168 generates a request for customer notification via a multimedia IPTV presentation. For example, at block 750, the multimedia notice request generator 464 included in the customer notifier 168 generates a multimedia notice request that is sent to, for example, the IPTV notification mediation server 146 of FIG. 1. The generated multimedia notice request causes the IPTV notification mediation server 146 to transmit multimedia information to appropriate CPE devices (e.g., such as the media device 110) for presentation to the network customer affected by the potentially improper activity. Control then returns to block 705 and blocks subsequent thereto at which the customer notifier 168 monitors for a subsequent improper usage notification command received from, for example, the alert processor 164.

Figure 8:
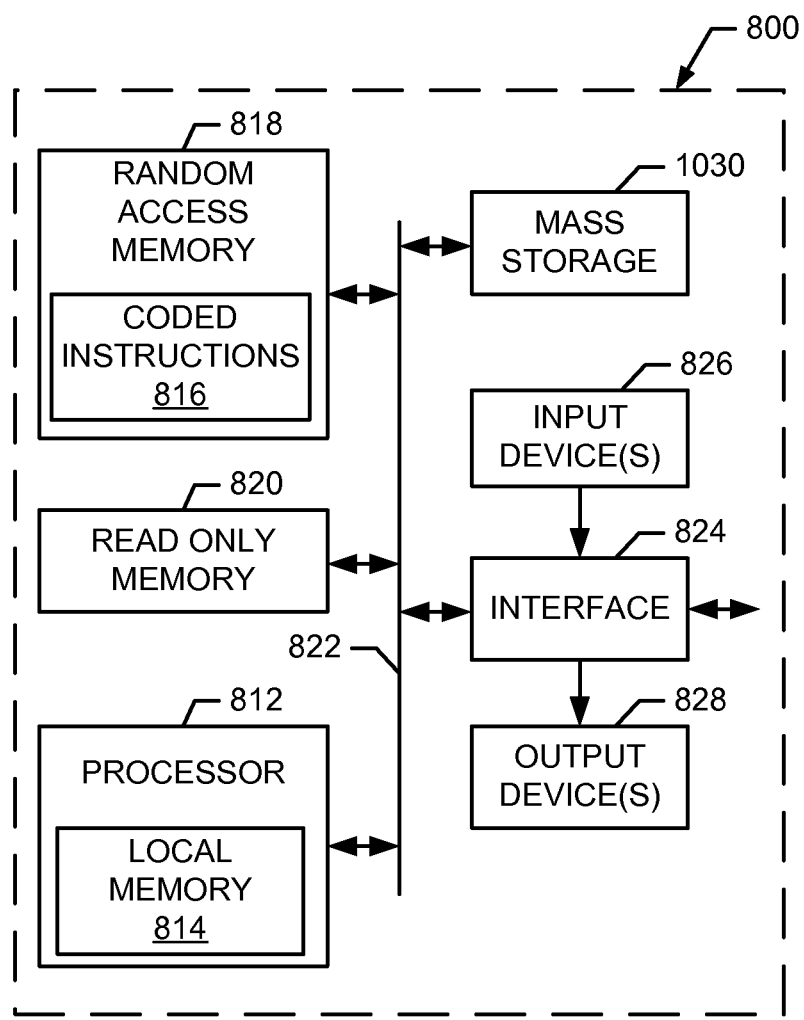
FIG. 8 is a block diagram of an example computer that may execute the example machine readable instructions of FIGS. 5A-5C, 6 and/or 7 to implement the example alert processor, the example automatic verifier and/or the example customer notifier, respectively, of FIG. 4 and/or the example improper usage mitigation system of FIG. 1.

FIG. 8 is a block diagram of an example computer 800 capable of implementing the apparatus and methods disclosed herein. The computer 800 can be, for example, a server, a personal computer, a personal digital assistant (PDA), an internet appliance, a DVD player, a CD player, a digital video recorder, a personal video recorder, a set top box, or any other type of computing device. Persons of ordinary skill in the art will appreciate that any or all of the example alert processor 164, the example automatic verifier 180, the example customer notifier 168, the example activity alert monitor 402, the example policy evaluator 406, the example activity alert tracker 412, the example verification command generator 414, the example notification command generator 418, the example verification command controller 440, the example validation request generator 442, the example disconnect request generator 444, the example notification command controller 460, the example voice notice request generator 462 and/or the example multimedia notice request generator 464 may be implemented in and/or implemented by the example computer 800.

The system 800 of the illustrated example includes a processor 812 such as a general purpose programmable processor. The processor 812 includes a local memory 814, and executes coded instructions 816 present in the local memory 814 and/or in another memory device. The processor 812 may execute, among other things, the machine readable instructions represented in FIGS. 5A-5C, 6 and 7. The processor 812 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 812 is in communication with a main memory including a volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown) in a conventional manner.

The computer 800 also includes a conventional interface circuit 824. The interface circuit 824 may be implemented by any type of well known interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device (s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 800 also includes one or more mass storage devices 830 for storing software and data. Examples of such mass storage devices 830 include floppy disk drives, hard drive disks, compact disk drives and digital versatile disk (DVD) drives. The mass storage devices 830 may implement any or all of the call record storage unit 134, the rules and policies storage unit 172 and/or the call history storage unit 174. Additionally or alternatively, the volatile memory 818 may implement any or all of the call record storage unit 134, the rules and policies storage unit 172 and/or the call history storage unit 174.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A system to mitigate improper network usage, the system comprising:
   memory including machine readable instructions; and
   a processor responsive to the machine readable instructions to perform operations comprising:
   determining whether to issue a notification in response to an activity alert corresponding to monitored usage of a communication network by a user device, the monitored usage occurring after the user device has been granted access to the communication network;
   in response to the activity alert, initiating transmission of a session initiation protocol network-initiated re-authentication request to a voice over Internet protocol call processor to cause the user device to perform a re-authentication procedure with the voice over Internet protocol call processor;
   in response to determining the session initiation protocol re-authentication procedure was unsuccessful, initiating subsequent transmission of (i) a teardown request to the voice over Internet protocol call processor to cause the voice over Internet protocol call processor to teardown a current session initiation protocol session with the user device, and (ii) a session initiation protocol network-initiated de-registration request to the voice over Internet protocol call processor to cause a session initiation protocol de-registration procedure to be performed to de-register the user device from the voice over Internet protocol call processor; and
   causing the notification to be issued in response to the activity alert if both the session initiation protocol re-authentication procedure and the session initiation protocol de-registration procedure are unsuccessful, but not if at least one of the session initiation protocol re-authentication procedure and the session initiation protocol de-registration procedure are successful.

2. A system as defined in claim 1 wherein the user device is to re-register with the communication network after the session initiation protocol de-registration procedure is performed.

3. A system as defined in claim 1 wherein the processor is to initiate transmission of at least one of the session initiation protocol network-initiated re-authentication request and the session initiation protocol network-initiated de-registration request based on a threshold counter that is to count a type of activity alert.

4. A system as defined in claim 1 wherein the operations further comprise:
   accessing policy rules defining types of suspicious network activity, and
   using the policy rules to determine whether to at least one of issue the notification in response to the activity alert and respond to the activity alert.

5. A system as defined in claim 4 wherein the policy rules are based on a historical analysis of prior network activity within the communication network.

6. A system as defined in claim 1 further comprising a notification interface to notify at least one of a user of the user device or an operation support system when the notification is issued by the processor.

7. A system as defined in claim 1 wherein the operations further comprise subscribing through a session initiation protocol interface to a call usage event package published by voice over Internet protocol call processor.

8. A system as defined in claim 7 wherein the operations further comprise obtaining notification of the activity alert through the session initiation protocol interface.

9. A method to respond to a first activity alert corresponding to monitored usage of a communication network by a user device, the method comprising:
   sending a session initiation protocol network-initiated re-authentication request to a voice over Internet protocol call processor to cause the user device to perform a session initiation protocol re-authentication procedure with the voice over Internet protocol call processor when the first activity alert corresponds to a first policy condition;
   subsequently sending (i) a teardown request to the voice over Internet protocol call processor to cause the voice over Internet protocol call processor to teardown a current session initiation protocol session with the user device, and (ii) a session initiation protocol network-initiated de-registration request to the voice over Internet protocol call processor to cause a session initiation protocol de-registration procedure to be performed to de-register the user device from the voice over Internet protocol call processor, in response to determining the session initiation protocol re-authentication procedure was unsuccessful;
   determining whether the first activity alert corresponds to improper activity based on a result of at least one of the session initiation protocol re-authentication procedure and the session initiation protocol de-registration procedure; and
   sending a multimedia notification to a media device separate from the user device and associated with a user of the user device if both the session initiation protocol re-authentication procedure and the session initiation protocol de-registration procedure are unsuccessful, but not sending the multimedia notification to the media device if at least one of the session initiation protocol re-authentication procedure and the session initiation protocol de-registration procedure are successful.

10. A method as defined in claim 9 wherein the method further comprises causing access to the communication network to be suspended for the user device after receiving an improper result from the session initiation protocol de-registration procedure.

11. A method as defined in claim 9 wherein at least one of signaling the voice over Internet protocol call processor to cause the user device to perform the session initiation protocol re-authentication procedure and signaling the voice over Internet protocol call processor to cause the session initiation protocol de-registration procedure to be performed is based on a threshold counter that is to count a type of activity alert.

12. A method as defined in claim 9 further comprising notifying at least one of the user of the user device or an operation support system when the first activity alert is determined to correspond to the improper activity.

13. A tangible machine readable storage device comprising machine readable instructions which, when executed, cause a machine to perform operations comprising:

sending a session initiation protocol network-initiated re-authentication request to a voice over Internet protocol call processor to cause a user device in a communication network to perform a session initiation protocol re-authentication procedure with the voice over Internet protocol call processor in response to a first activity alert corresponding to a first policy condition;

subsequently sending (i) a teardown request to the voice over Internet protocol call processor to cause the voice over Internet protocol call processor to teardown a current session initiation protocol session with the user device, and (ii) a session initiation protocol network-initiated de-registration request to the voice over Internet protocol call processor to cause a session initiation protocol de-registration procedure to be performed to de-register the user device from the voice over Internet protocol call processor, in response to determining the session initiation protocol re-authentication procedure was unsuccessful;

determining whether the first activity alert corresponds to improper activity based on a result of at least one of the session initiation protocol re-authentication procedure or the session initiation protocol de-registration procedure; and sending a multimedia notification to a media device separate from the user device and associated with a user of the user device if both the session initiation protocol re-authentication procedure and the session initiation protocol de-registration procedure are unsuccessful, but refraining from sending the multimedia notification to the media device if at least one of the session initiation protocol re-authentication procedure and the session initiation protocol de-registration procedure are successful.

14. A storage medium as defined in claim 13 wherein the operations further comprise causing access to the communication network to be suspended for the user device after receiving an improper result from the session initiation protocol de-registration procedure.

15. A storage medium as defined in claim 13 wherein at least one of signaling the voice over Internet protocol call processor to cause the user device to perform the session initiation protocol re-authentication procedure and signaling the voice over Internet protocol call processor to cause the session initiation protocol de-registration procedure to be performed is based on a threshold counter that is to count a type of activity alert.

16. A storage medium as defined in claim 13 wherein the operations further comprise notifying at least one of the user of the user device or an operation support system when the first activity alert is determined to correspond to the improper activity.

* * * * *